United States Patent
McGahey et al.

(10) Patent No.: US 10,151,237 B2
(45) Date of Patent: Dec. 11, 2018

(54) TURBOCHARGER TURBINE STAGE VALVES CONTROLLED BY A SINGLE ACTUATOR

(71) Applicant: BorgWarner Inc., Auburn Hills, MI (US)

(72) Inventors: Michael E. McGahey, Troy, MI (US); Brent Chamberlain, West Bloomfield, MI (US); Mark Ventimiglia, Sterling Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 75 days.

(21) Appl. No.: 15/533,474

(22) PCT Filed: Dec. 8, 2015

(86) PCT No.: PCT/US2015/064407
§ 371 (c)(1),
(2) Date: Jun. 6, 2017

(87) PCT Pub. No.: WO2016/094360
PCT Pub. Date: Jun. 16, 2016

(65) Prior Publication Data
US 2017/0370278 A1      Dec. 28, 2017

Related U.S. Application Data

(60) Provisional application No. 62/090,905, filed on Dec. 12, 2014.

(51) Int. Cl.
*F02B 37/02* (2006.01)
*F16K 3/08* (2006.01)
*F02B 37/18* (2006.01)

(52) U.S. Cl.
CPC .......... *F02B 37/025* (2013.01); *F02B 37/183* (2013.01); *F16K 3/085* (2013.01); *Y02T 10/144* (2013.01)

(58) Field of Classification Search
CPC ...... F02B 37/025; F02B 37/183; F16K 3/085; Y02T 10/144
(Continued)

(56) References Cited

U.S. PATENT DOCUMENTS 4,526,004 A * 7/1985 French ................... F02B 37/02
60/602
6,543,228 B2 * 4/2003 Deacon ................. F02B 37/183
137/527
(Continued)

FOREIGN PATENT DOCUMENTS

DE   102005045387 A1   3/2007
DE   102006058102 A1   6/2008
(Continued)

OTHER PUBLICATIONS

International Search Report and Written Opinion in International Application No. PCT/US2015/064407, dated Feb. 17, 2016.

*Primary Examiner* — Hoang Nguyen
(74) *Attorney, Agent, or Firm* — Eric L. Doyle; Stephan A. Pendorf; Patent Central LLC

(57) ABSTRACT

A turbocharger (1) including a twin scroll turbine and a valve assembly (40, 140) disposed in the exhaust gas inlet (24, 124) that is configured to control the flow exhaust gas through the turbine. The valve assembly (40, 140) includes two rotary valves (60, 160, 80, 180) actuated by a common valve shaft (44, 144). One of the valves (60, 180) may control exhaust gas flow to a volute or between volutes, and the other (80, 160) may control wastegate exhaust gas flow. The valve shaft (44, 144) is driven by an actuator to rotate about the valve shaft rotational axis (46, 146) such that the
(Continued)

first valve (60, 160) and the second valve (80, 180) can each be selectively moved between a closed position and an open position, and the time sequence order of opening of the first valve (60, 160) and the second valve (80, 180) is selectable.

11 Claims, 15 Drawing Sheets

(58) Field of Classification Search
USPC .............. 60/602, 605.1, 605.2; 137/625.47
See application file for complete search history.

(56) References Cited

U.S. PATENT DOCUMENTS

| | | | |
|---|---|---|---|
| 6,983,596 B2* | 1/2006 | Frankenstein | F02B 37/025 |
| | | | 60/602 |
| 7,637,106 B2 | 12/2009 | Hertweck et al. | |
| 8,955,318 B2* | 2/2015 | Marques | F02F 1/24 |
| | | | 184/6.11 |
| 8,966,895 B2* | 3/2015 | Marques | F01D 25/28 |
| | | | 415/177 |
| 2011/0000208 A1* | 1/2011 | Robinson | F02B 37/001 |
| | | | 60/602 |

FOREIGN PATENT DOCUMENTS

| | | |
|---|---|---|
| EP | 2246545 A1 | 11/2010 |
| WO | 2006053653 A1 | 5/2006 |

* cited by examiner

TURBOCHARGER TURBINE STAGE VALVES CONTROLLED BY A SINGLE ACTUATOR

BACKGROUND

A turbocharger is a type of forced induction system used with internal combustion engines. Turbochargers typically include a turbine housing connected to the engine's exhaust manifold, a compressor housing connected to the engine's intake manifold, and a centrally located bearing housing coupling the turbine and compressor housings together. A turbine wheel in the turbine housing is rotatably driven by an inflow of exhaust gas supplied from the exhaust manifold. A shaft rotatably supported in the bearing housing connects the turbine wheel to a compressor impeller in the compressor housing so that rotation of the turbine wheel causes rotation of the compressor impeller. As the compressor impeller rotates, it increases the air mass flow rate, airflow density and air pressure delivered to the engine's cylinders via the engine's intake manifold.

Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, naturally aspirated engines. Using a smaller engine in a vehicle has the desirable effect of decreasing the mass of the vehicle, increasing performance, and enhancing fuel economy. Moreover, the use of turbochargers permits more complete combustion of the fuel delivered to the engine, which reduces undesirable emissions.

SUMMARY

In some aspects, a turbocharger that is configured to be connected to an engine includes a turbine section. The turbine section includes a turbine wheel, and a turbine housing that encloses the turbine wheel and defines an exhaust gas inlet, an exhaust gas outlet, a first turbine volute disposed between the exhaust gas inlet and the turbine wheel and a second turbine volute disposed between the exhaust gas inlet and the turbine wheel. The first and second turbine volutes are separated by a dividing wall. The turbine section includes a bypass passage that permits communication between the exhaust gas inlet and the exhaust gas outlet and bypasses the turbine wheel, a first valve configured to control flow through a first port that communicates with the second turbine volute, a second valve configured to control flow through a second port that communicates with the bypass passage and a valve shaft including a rotational axis. The valve shaft is connected to both the first valve and the second valve, and is driven by an actuator to rotate about the rotational axis such that the first valve and the second valve can each be selectively moved between a closed position and an open position, and the time sequence order of opening of the first valve and the second valve is selectable.

The turbocharger may include one or more of the following features: The first valve opens at a different time than the second valve. The first valve and the second valve are rotary valves. The exhaust gas inlet includes an inlet flange including a first flange opening and a second flange opening, a first passage that extends between the first flange opening and the first turbine volute, a second passage that extends between the second flange opening and the second turbine volute and a valve housing disposed in the exhaust gas inlet between the inlet flange and the first and second turbine volutes. The valve housing includes a connecting chamber including the first port and a third port, the first port connecting the connecting chamber and the second passageway, and the third port connecting the connecting chamber and the first passageway. The valve housing includes a wastegate chamber that communicates with the bypass passage, the wastegate chamber including the second port and a fourth port, the second port connecting the wastegate chamber and the first passage, and the fourth port connecting the wastegate chamber and the second passage. The first valve is configured to control flow through the first port and the third port, and the second valve is configured to control flow through the second port and the fourth port. The connecting chamber and the wastegate chamber are disposed on opposed sides of the exhaust gas inlet. When the first valve is in an open position, the first passage communicates with the second passage via the connecting chamber.

In addition, the turbocharger may include one or more of the following additional features: The exhaust gas inlet includes an inlet flange including a flange opening, a first passage that extends between the flange opening and the first turbine volute, a second passage that communicates with the second turbine volute, and a valve housing disposed in the exhaust gas inlet between the inlet flange and the first and second turbine volutes. The valve housing includes a connecting chamber that communicates with the second passage, the connecting chamber including the first port that connects the connecting chamber and the flange opening, and a wastegate chamber that communicates with the bypass passage, the wastegate chamber communicating with the connecting chamber via valve openings of the second valve. When the first valve is in an open position and the second valve is in closed position, the second passage communicates with the flange opening and a portion of gas flowing through the flange opening can flow to the second turbine volute via the second passage. When the first valve is in an open position and the second valve is in an open position, a portion of gas flowing through the flange opening is diverted to the bypass passage via the first port and the second port. In addition, when the first valve and the second valve are in a closed position, all gas flowing through the flange opening is directed to the first passage.

In some aspects, a turbocharger that is configured to be connected to an engine includes a turbine section including a turbine wheel and a turbine housing that encloses the turbine wheel. The turbine housing defines an exhaust gas inlet, an exhaust gas outlet, a first turbine volute disposed between the exhaust gas inlet and the turbine wheel, and a second turbine volute disposed between the exhaust gas inlet and the turbine wheel. The first and second turbine volutes are separated by a dividing wall. The exhaust gas inlet includes an inlet flange including a first flange opening and a second flange opening, a first passage that extends between the first flange opening and the first turbine volute, a second passage that extends between the second flange opening and the second turbine volute, and a valve housing disposed in the exhaust gas inlet between the inlet flange and the first and second turbine volutes. The valve housing includes a and a second connecting port that communicates with the second passage, and a wastegate chamber having a first wastegate port that communicates with the first passage and a second wastegate port that communicates with the second passage. The valve housing includes a first valve configured to control flow through the first connecting port and the second connecting port, a second valve configured to control flow through the first wastegate port and the second wastegate port, and a valve shaft including a rotational axis. The valve shaft is connected to both the first valve and the second valve, and is driven by an actuator to rotate about the rotational axis such that the first valve and the second valve can each be selectively moved between a closed position and an open position, and the time sequence order of opening of the first valve and the second valve is selectable.

The turbocharger may include one or more of the following features: The wastegate chamber includes a third wastegate port that communicates with the exhaust gas outlet. The connecting chamber and the wastegate chamber are disposed on opposed sides of the exhaust gas inlet. When the first valve is in an open position, the first passage communicates with the second passage via the connecting chamber.

In some aspects, a turbocharger that is configured to be connected to an engine includes a turbine section. The turbine section includes a turbine wheel and a turbine housing that encloses the turbine wheel. The turbine housing defines an exhaust gas inlet, an exhaust gas outlet, a first turbine volute disposed between the exhaust gas inlet and the turbine wheel, and a second turbine volute disposed between the exhaust gas inlet and the turbine wheel. The first and second turbine volutes separated by a dividing wall. The exhaust gas inlet includes an inlet flange including a flange opening, a first passage that extends between the flange opening and the first turbine volute, a second passage that communicates with the second turbine volute, and a valve housing disposed in the exhaust gas inlet between the inlet flange and the first and second turbine volutes. The valve housing includes a connecting chamber having a first connecting port that communicates with flange opening and a second connecting port that communicates with the second passage. The valve housing includes a wastegate chamber having a first wastegate port that communicates with the connecting chamber and a second wastegate port that that communicates with exhaust gas outlet. The valve housing also includes a first valve configured to control flow through the first connecting port, a second valve configured to control flow through the first wastegate port, and a valve shaft including a rotational axis, the valve shaft connected to both the first valve and the second valve. The valve shaft is driven by an actuator to rotate about the rotational axis such that the first valve and the second valve can each be selectively moved between a closed position and an open position, and the time sequence order of opening of the first valve and the second valve is selectable.

The turbocharger may include one or more of the following features: The second connecting port and the second wastegate port are valve-free. When the first valve is in an open position and the second valve is in closed position, the second passage communicates with the flange opening and a portion of gas flowing through the flange opening can flow to the second turbine volute via the second passage. When the first valve is in an open position and the second valve is in an open position, a portion of gas flowing through the flange opening is diverted to the bypass passage via first connecting port and the second port; and the second wastegate port. When the first valve and the second valve are in a closed position, all gas flowing through the flange opening is directed to the first passage.

In some aspects, a turbocharger that is configured to be connected to an engine includes a turbine stage and a compressor stage. The turbine stage includes a turbine wheel and a turbine housing that encloses the turbine wheel. The turbine housing defines a twin scroll volute disposed between an exhaust gas inlet and the turbine wheel, and a bypass passage that permits communication between the exhaust gas inlet and an exhaust gas outlet and bypasses the turbine wheel. The turbine stage further includes a valve assembly disposed in the exhaust gas inlet. The valve assembly includes a first valve configured to control flow through a first port that communicates with one of the turbine volutes, and a second valve configured to control flow through a second port that communicates with the bypass passage. The valve assembly includes a valve shaft connected to both the first valve and the second valve, and the valve shaft is rotated by an actuator such that the first valve and the second valve can each be selectively moved between a closed position and an open position, and the time sequence order of opening of the first valve and the second valve is selectable. By this configuration, the first valve can open either before or after the second valve, and both valves are operated by a single actuator.

In one exemplary embodiment, the valve assembly is configured to permit the turbine stage to switch between single scroll operation and twin scroll operation while simultaneously providing wastegate functionality if desired. In particular, when the valve assembly is in a first valve configuration, one of the scrolls of the twin scroll volute is closed and the turbine section operates as a mono-scroll turbine. This allows exhaust gas flow to be routed through a single volute, allowing the turbine stage to function at half of its potential size, which reduces the time required to provide boost. This is advantageous during low engine speed (rpm), low engine load (BMEP) or reduced cylinder displacement for example due to deactivated cylinders, where there is relatively less exhaust gas flow. When the valve assembly is in a second valve configuration, exhaust gas flow is permitted to both scrolls of the twin scroll volute. Thus, the second volute is open at higher engine speeds to accommodate the increased exhaust gas flow rate associated with the higher engine speeds. When the valve assembly is in a third valve configuration, exhaust gas flow is permitted to both scrolls of the twin scroll volute, and a portion of the exhaust gas flow is diverted to the bypass passage, thereby preventing over speed rotation of the rotating assembly that includes the turbine wheel, the compressor wheel, and the connecting shaft.

In another exemplary embodiment, the valve assembly is configured to permit the turbine stage to switch between twin scroll operation, double scroll operation, and a wastegated twin scroll operation. In particular, when the valve assembly is in a first valve configuration, the first scroll of the twin scroll volute is prevented from communicating with the second scroll of the twin scroll volute, and the turbine section operates as a conventional twin scroll volute. In this configuration, the combustion cylinder's exhaust pulses are separated between the scrolls, providing higher turbine efficiencies at low engine speeds. When the valve assembly is in a second valve configuration, the first scroll of the twin scroll volute is permitted to communicate with the second scroll of the twin scroll volute, resulting in a mono-scroll operation. This is advantageous at high engine speeds during which large pulse pressures are generated in the turbine housing. Since the first scroll and second scroll are communicating, gas can flow between the two scrolls, permitting pressure relief within the scrolls. When the valve assembly is in a third valve configuration, the first scroll of the twin scroll volute is not permitted to communicate with the second scroll of the twin scroll volute, resulting in a dual-scroll operation. In addition, a portion of the exhaust gas flow from each scroll is diverted to the bypass passage, thereby preventing over speed rotation of the rotating assembly that includes the turbine wheel, the compressor wheel, and the connecting shaft.

In both exemplary embodiments, two valves are driven by a common rotating valve shaft, and are thus driven by a single actuator, which results in reduced manufacturing costs and a reduced overall size of the turbocharger.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

Figure 1:
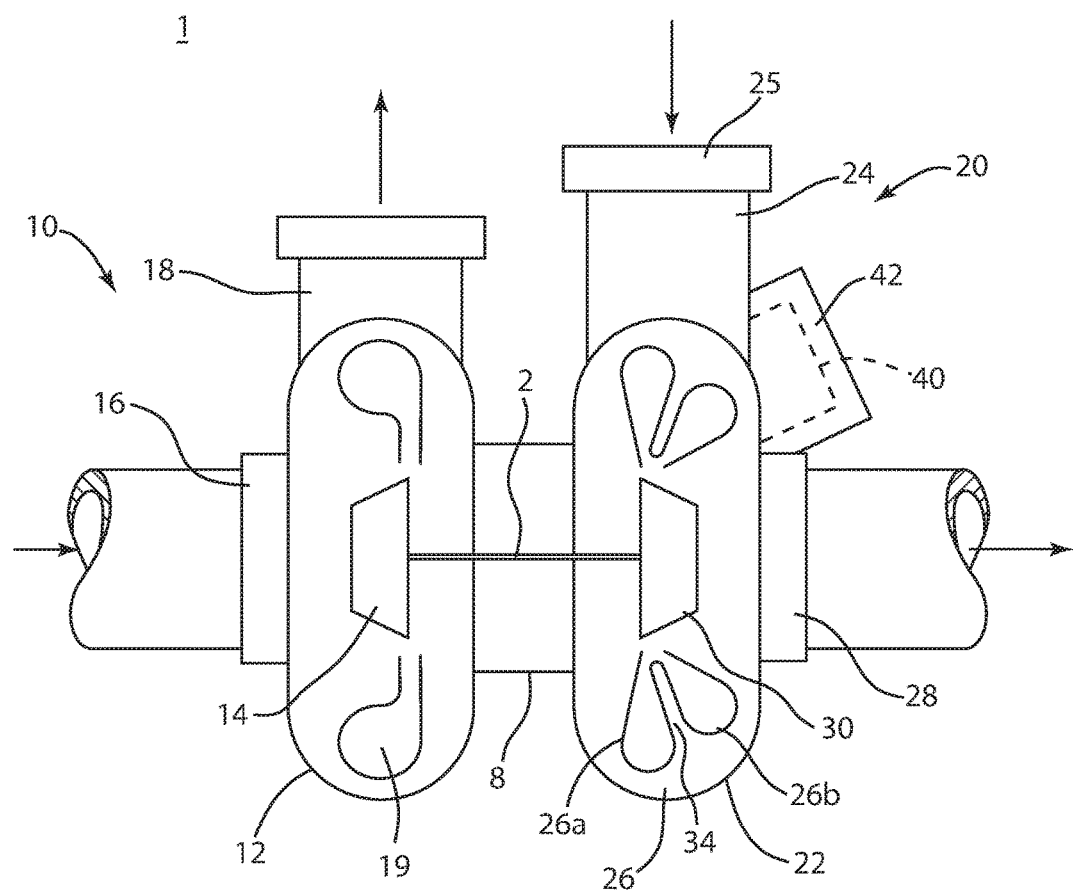
FIG. 1 is a schematic illustration of an exhaust gas turbocharger including a valve assembly disposed in the turbine section exhaust gas inlet.
Figure 2:
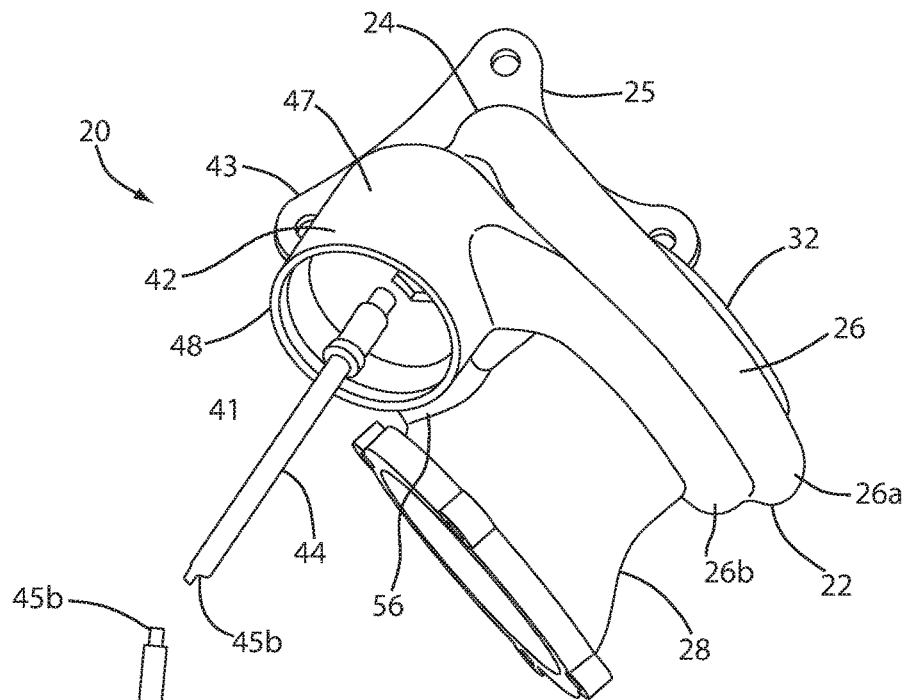
FIG. 2 is a side perspective view of the turbine section including the valve assembly of FIG. 1.
Figure 3:
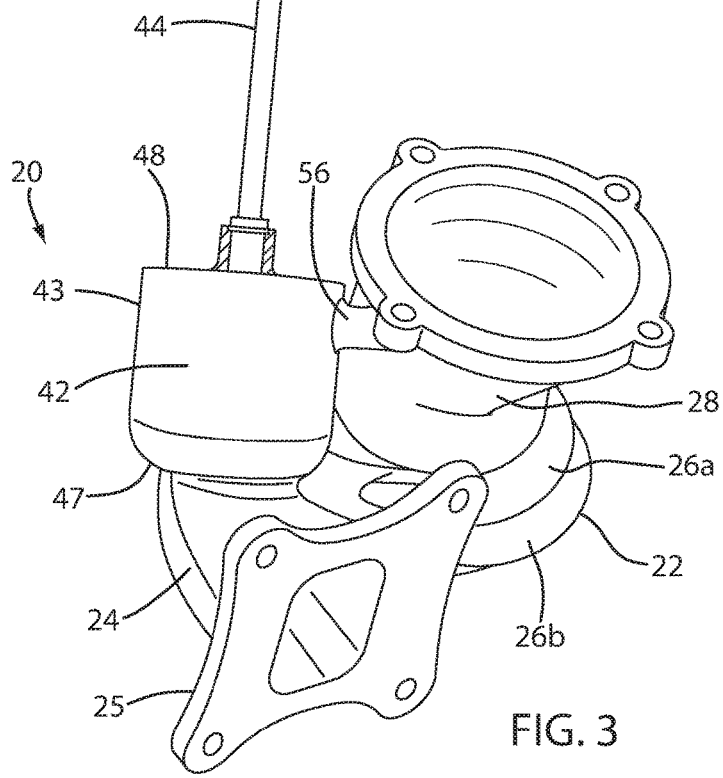
FIG. 3 is an end perspective view of the turbine section including the valve assembly of FIG. 1.
Figure 4:
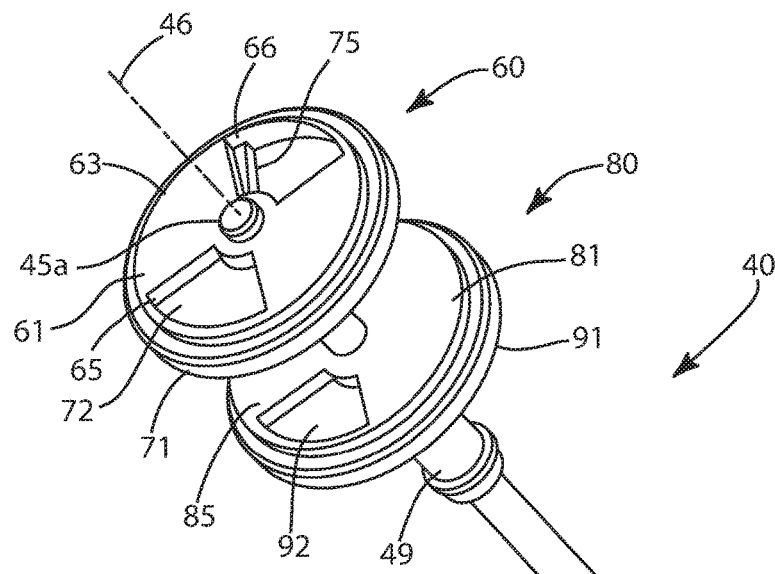
FIG. 4 is a front perspective view of the valve assembly of FIG. 1 isolated from the turbine section.
Figure 5:
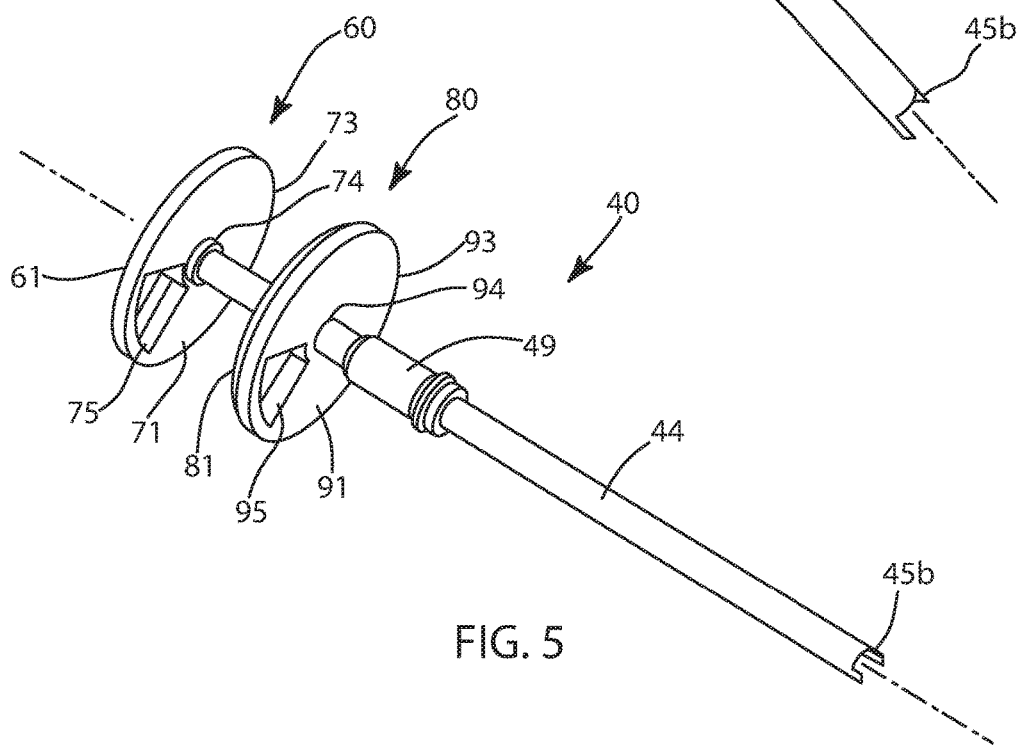
FIG. 5 is a rear perspective view of the valve assembly of FIG. 1 isolated from the turbine section.

Referring to FIGS. 1-3, an exhaust gas turbocharger 1 includes a compressor section 10, a turbine section 20, and a bearing housing 8 disposed between and connecting the compressor section 10 to the turbine section 20. The turbine section 20 includes a turbine housing 22 that defines an exhaust gas inlet 24, an exhaust gas outlet 28, and twin scroll volute 26 disposed in the fluid path between the exhaust gas inlet 24 and exhaust gas outlet 28. The twin scroll volute 22 includes a first turbine volute 26a and a second turbine volute 26b separated from the first turbine volute via a wall 34. A turbine wheel 30 is disposed in the turbine housing 22 between the first and second turbine volutes 26a, 26b and the exhaust gas outlet 28. The turbine section 20 includes a bypass passage 56 that connects the exhaust gas inlet 24 to the exhaust gas outlet 28 while bypassing the turbine wheel 30, and a valve assembly 40 that is configured to control exhaust gas flow through the bypass passage 56. In addition, the turbine housing 22 includes an annular connecting flange 32 used to join the turbine section 20 to the bearing housing 8 via bolts or a vee band (not shown).

A turbocharger shaft 2 is connected to the turbine wheel 30, is rotatably supported within in the bearing housing 8, and extends into the compressor section 10. The compressor section 10 includes a compressor housing 12 that defines an air intake 16, an air outlet 18, and a compressor volute 19. A compressor wheel 14 is disposed in the compressor housing 12 between the air intake 16 and the compressor volute 19. The compressor wheel 14 is connected to, and driven by, the turbocharger shaft 2.

In use, the turbine wheel 30 in the turbine housing 22 is rotatably driven by an inflow of exhaust gas supplied from the exhaust manifold of an engine. Since the turbocharger shaft 2 is rotatably supported in the bearing housing 8 and connects the turbine wheel 30 to the compressor wheel 14 in the compressor housing 12, the rotation of the turbine wheel 30 causes rotation of the compressor wheel 14. As the compressor wheel 14 rotates, it increases the air mass flow rate, airflow density and air pressure delivered to the engine's cylinders via an outflow from the compressor air outlet 18, which is connected to the engine's intake manifold.

In the turbocharger 1, the amount of exhaust gas delivered to the turbine wheel 30 is controlled via the valve assembly 40 to assure that the compressor section 10 produces the proper boost over the full range of engine operating speeds, as discussed further below. The valve assembly 40 is supported within a valve housing 42 that is disposed in the exhaust gas inlet 24 between an inlet flange 25 and the first and second turbine volutes 26a, 26b.

Referring to FIGS. 4-7, the valve assembly 40 includes a valve shaft 44, a first valve 60 disposed on an end 45a of the valve shaft 44, and a second valve 80 disposed on the shaft 44 at a location slightly spaced apart from the first valve 60. Each of the first and second valves 60, 80 includes a valve body 61, 81 that moves relative to a valve seat 71, 91 to open and close the valve 60, 80. The first and second valves 60, 80 are rotary valves. As used herein, the term rotary valve refers to a valve in which the valve shaft 44 is fixed directly to the valve body 61, 81, and extends in a direction normal to a valve seat-facing surface 62, 82 of the valve body 61, 81. When the valve shaft 44 is rotated about its longitudinal axis 46, the valve body 61, 81 rotates about the shaft longitudinal axis 46 such that the valve body 61, 81 remains parallel to, and rotatingly slides relative to, the valve seat 71, 91.

Figure 6:
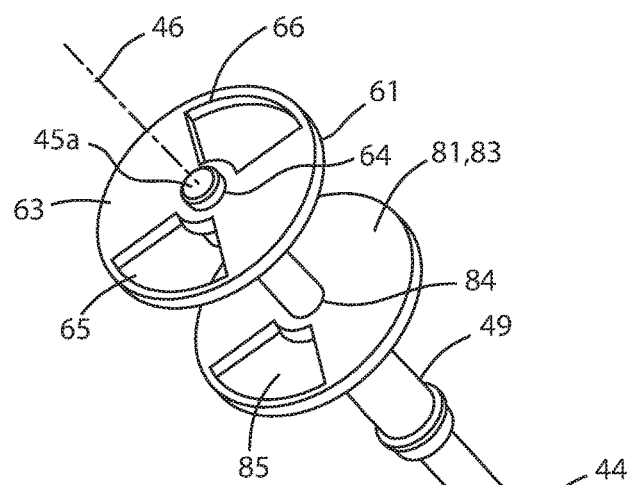
FIG. 6 is a front perspective view of the valve assembly of FIG. 1 isolated from the turbine section and omitting the valve seats for clarity.
Figure 7:
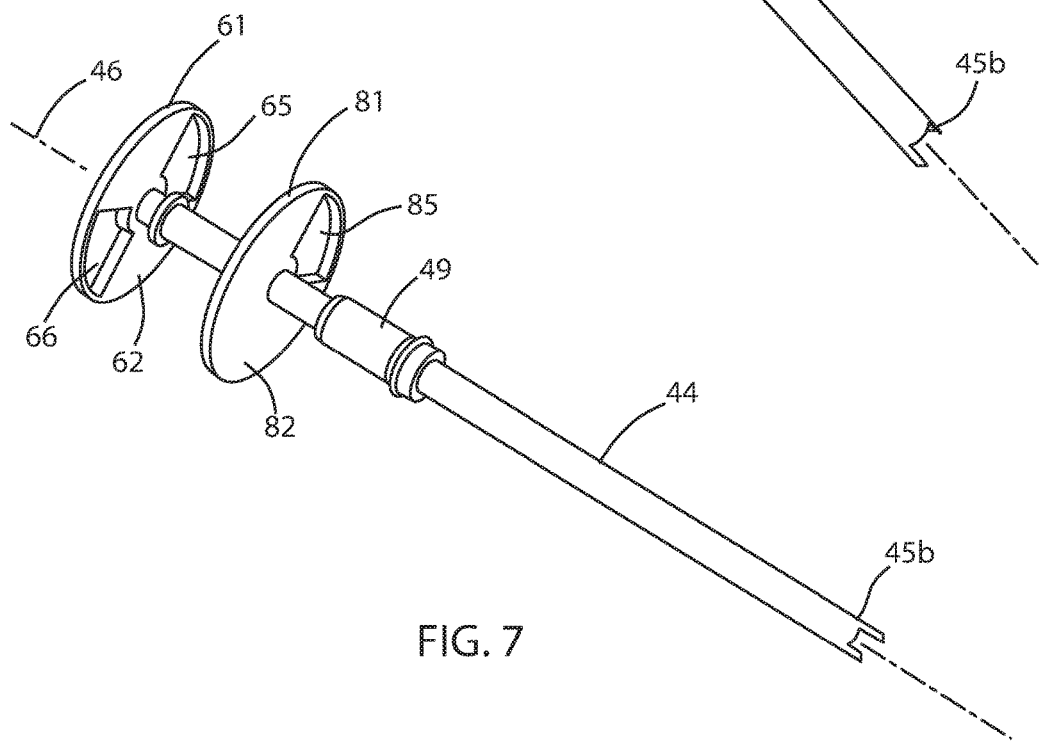
FIG. 7 is a rear perspective view of the valve assembly of FIG. 1 isolated from the turbine section and omitting the valve seats for clarity.

The first valve body 61 and the second valve body 81 are similar in that each is a rigid, thin, disc-shaped member having a circular profile (FIGS. 6 and 7). Each of the first and second valve bodies 61, 81 include a central opening 64, 84 which receives the valve shaft 44 and is fixed thereto. In particular, the first and second valve bodies 61, 81 are connected to the valve shaft 44 via the respective central opening 64, 84, for example via a press fit, spline fit, or other conventional connection method. The first valve body 61 includes two valve openings 65, 66. The valve openings 65, 66 of the first valve body 61 are disposed on opposed sides of the shaft 44 and have a fan shape (e.g., a truncated sector shape). The second valve body 81 includes a single valve opening 85 having a fan shape. When the first valve body 61 and the second valve body 81 are assembled with the shaft 44, the second valve body valve opening 85 is longitudinally aligned with one of the first valve body valve openings (e.g., valve opening 65).

The first valve seat 71 and the second valve seat 91 are similar in that each is a rigid, thin disc-shaped member having a circular profile (FIGS. 4 and 5) that is of slightly larger diameter than its respective valve body 61, 81. Each of the first and second valve seats 71, 91 includes a central opening 74, 94 which receives the valve shaft 44 therethrough and permits relative rotation between the shaft 44 and the respective valve seat 71, 91. In some embodiments, a bushing or bearing (not shown) may be disposed in the central opening 74, 94 to enhance support of the valve shaft 44. Each of the first and second valve seats 71, 91 includes a single valve opening 75, 95 having a fan shape. When the first valve seat 71 and the second valve seat 91 are assembled with the shaft 44, the second valve seat valve opening 95 is longitudinally aligned with the first valve seat valve opening 75.

The first valve body 61 is connected to the valve shaft 44 such that an outward-facing surface 63 near the valve shaft terminal end 45a, and an inward-facing surface 62 lies flush against a facing surface 72 of the first valve seat 71. Thus, the first valve body 61 is disposed between the first valve seat 71 and the valve shaft terminal end 45a.

Likewise, the second valve body 81 is connected to the valve shaft 44 such that an outward-facing surface 83 faces, and is spaced apart from, the first valve seat 71, and an inward-facing surface 82 lies flush against a facing surface 92 of the second valve seat 91. Thus, the second valve body 81 is disposed between the second valve seat 91 and the first valve seat 71.

Figure 8:
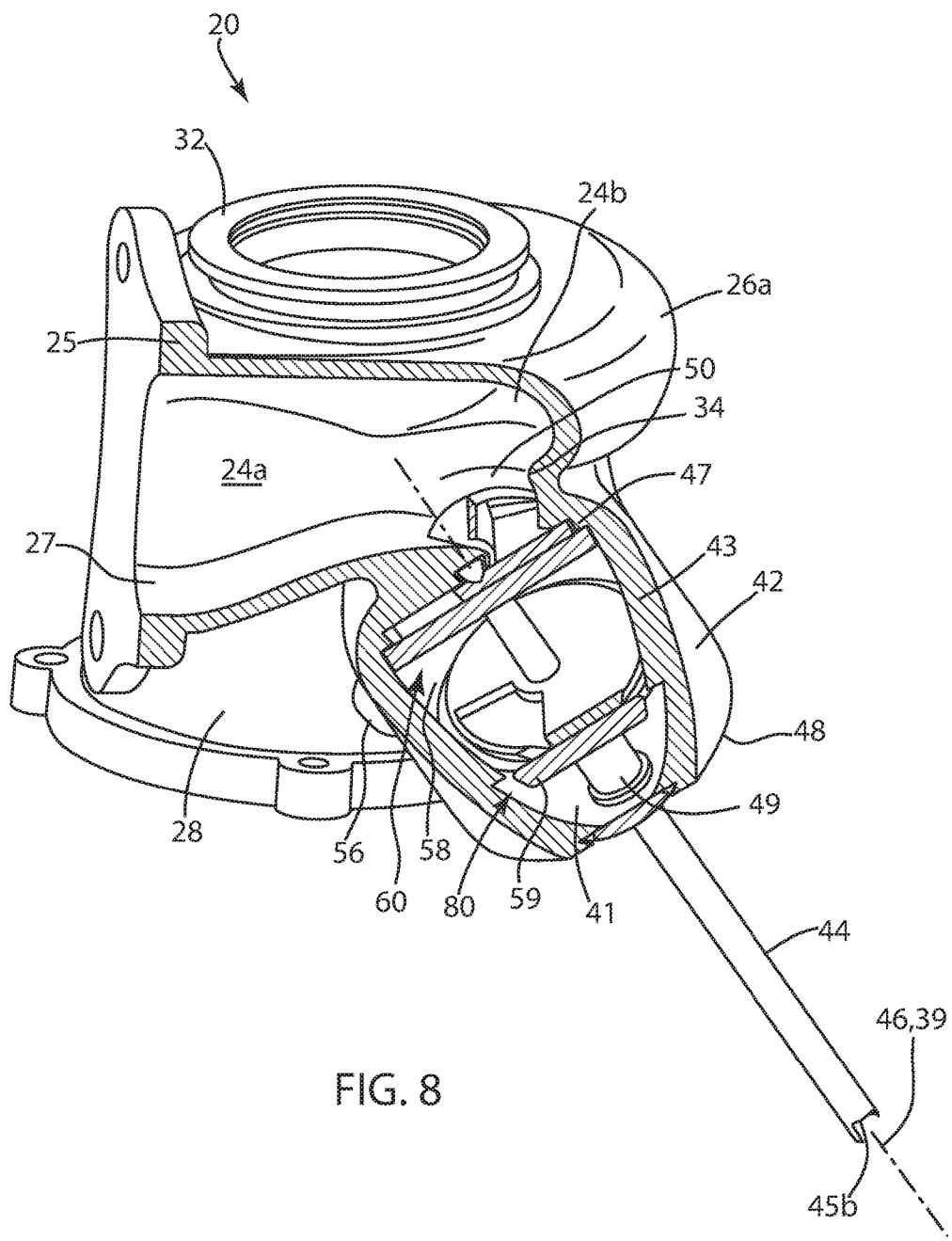
FIG. 8 is a cross-sectional view of the exhaust gas inlet and valve housing of the valve assembly of FIG. 1.
Figure 9:
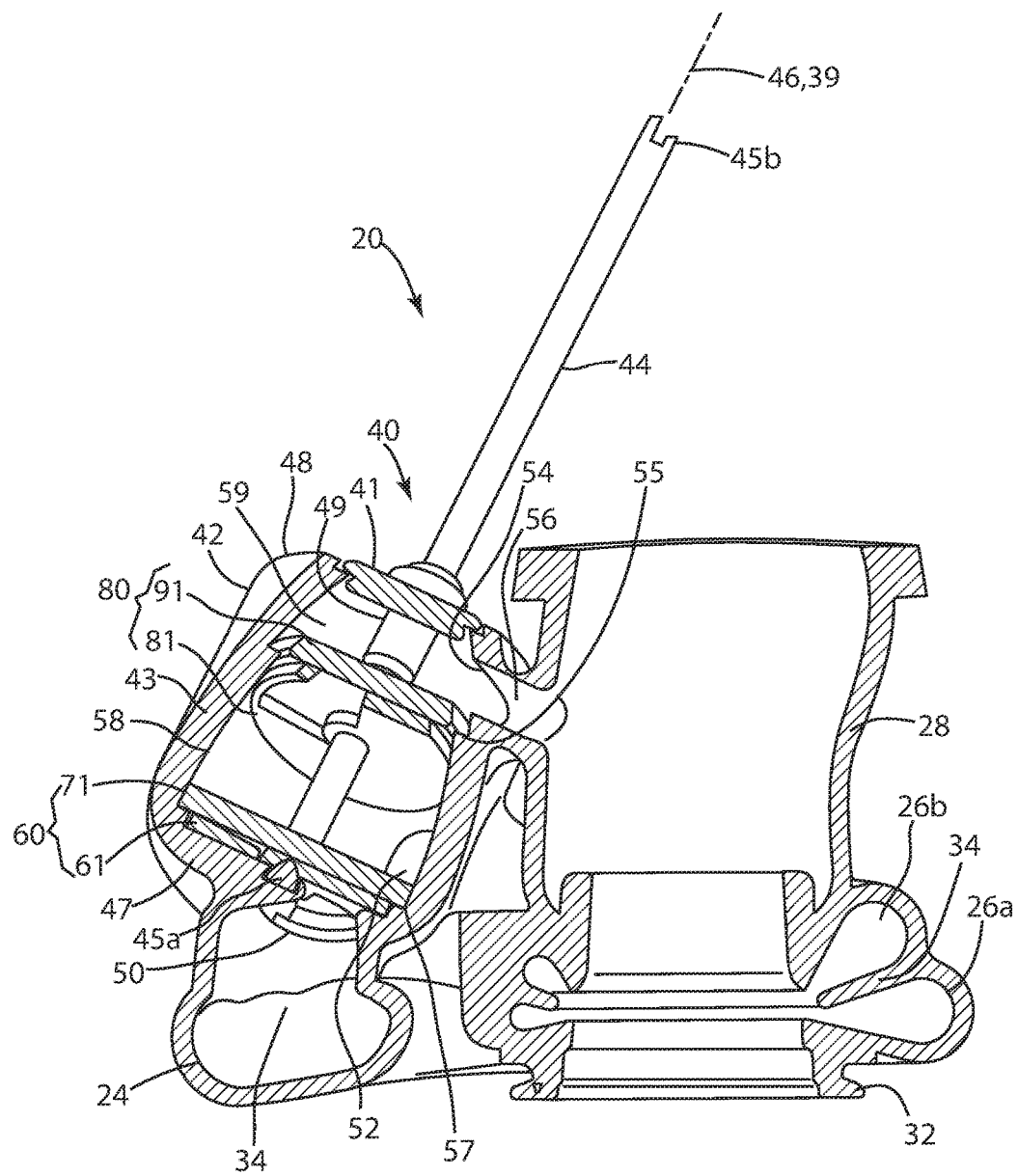
FIG. 9 is another cross-sectional view of the exhaust gas inlet and valve housing of the valve assembly of FIG. 1.
Figure 10:
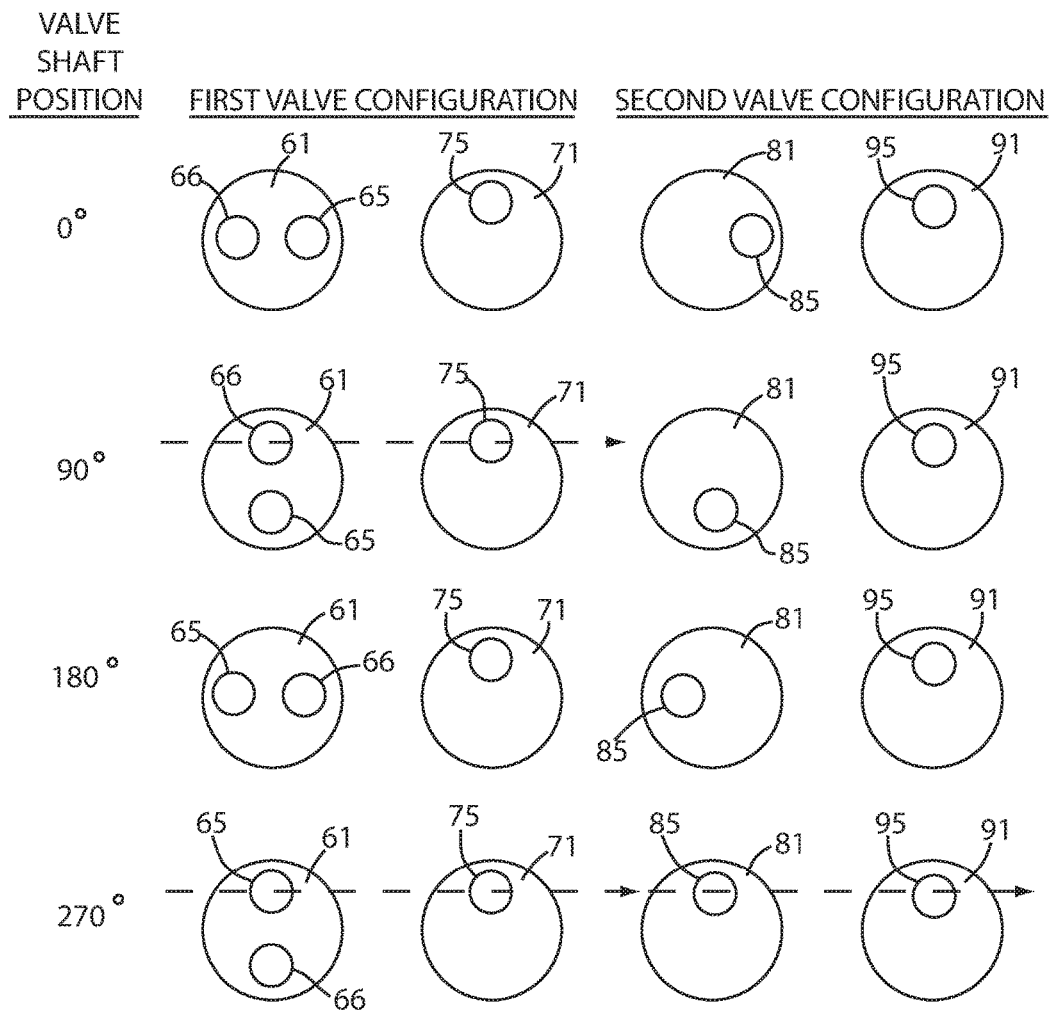
FIG. 10 is a schematic illustration of the relative orientations of the valve body and the valve seat for both the first and second valves of the valve assembly of FIG. 1 for various valve shaft rotational orientations.

Referring to FIGS. 8 and 9, in the illustrated embodiment, the exhaust gas inlet 24 includes an inlet flange 25 having a single inlet opening 27 (FIG. 8). At the inlet opening 27, a primary passage portion 24a of the exhaust gas inlet 24 defines a single, relatively large inlet passageway. At a location corresponding to the valve housing first end 47, the primary passage portion 24a bifurcates into two, somewhat smaller secondary passage portions 24b, 24c which are separated by an extension of the wall 34 that divides the turbine volutes 26a, 26b. A first secondary passage portion 24b provides communication between the primary passage portion 24a including the inlet opening 27 and the first turbine volute 26a, and a second secondary passage portion 24c provides communication between the primary passage portion 24a including the inlet opening 27 and the second turbine volute 26b. The valve assembly 40 is supported relative to the exhaust gas inlet 24 via the valve housing 42. The valve housing 42 has a generally cylindrical sidewall 43 that extends between the closed valve housing first end 47 that intersects and is integral with the exhaust gas inlet 24, and an open valve housing second end 48 that is opposed to the valve housing first end 47. The valve housing 42 is disposed on the exhaust gas inlet 24 at an angle such that a longitudinal centerline 39 of the valve housing 42 is at an acute angle relative to an axis defined by a direction of gas flow through the primary passage portion 24a.

The valve housing 42 includes three ports 50, 52, 54 (FIG. 9). The first port 50 is disposed in the valve housing first end 47 and permits communication between the valve housing 42 and the exhaust gas inlet 24. The first port 50 opens to the primary passage portion 24a of the exhaust gas inlet 24 in the vicinity of the passage bifurcation. The second port 52 is disposed in the valve housing sidewall 43 adjacent the valve housing first end 47, and permits communication between the valve housing 42 and the second secondary passage portion 24c, and thus also the second turbine volute 26b. The third port 54 is disposed in the valve housing sidewall 43 adjacent the valve housing second end 48, and permits communication between the valve housing 42 and the bypass passage 56 that extends between the valve housing 42 and the exhaust gas outlet 28.

The valve assembly 40 is disposed with the valve housing 42 such that the valve shaft longitudinal axis 46 and the valve housing longitudinal centerline 39 are generally co-axial. In addition, the first valve 60 is disposed in the valve housing first end 47 so as to be positioned between the first port 50 and the second port 52, and so as to control fluid flow through the first port 50. To this end, the first valve seat 71 is secured to a first circumferentially-extending valve housing shoulder 57 for example via press-fit or welding so as to form a seal with the valve housing 42. The first valve seat 71 is oriented such that the valve seat valve opening 75 overlies and is aligned with the first port 50.

In addition, the valve assembly 40 is disposed with the valve housing 42 such that the second valve 80 resides between the second port 52, which communicates with the second volute 26b, and the third port 54, which communicates with the bypass passage 56. To this end, the second valve seat 91 is secured to a second circumferentially-extending valve housing shoulder 55 for example via press fit or welding so as to form a seal with the valve housing 42.

In order to permit connection to the externally-located actuator, the valve shaft 44 extends out of the valve housing 42 through the open valve housing second end 48. A cover 41 is welded into the open second end 48 so as to form a seal therewith, and the valve shaft 44 is rotatably supported within the cover 41 via an elongated bushing 49. The cover 41 is supported on the valve shaft 44 at a location that is spaced apart from the second valve 80. In addition, the cover 41 is located between the second valve 80 and an end 45b of the valve shaft 44 that is configured to be connected to the actuator. The cover 41 and the bushing 49 permit the valve shaft 44 to rotate in a sealed manner relative to the valve housing 42.

The first and second valves 60, 80 segregate the valve housing 42 into a first chamber (e.g., a connecting chamber) 58 and a second chamber (e.g., a wastegate chamber) 59. The connecting chamber 58 is defined between the first valve 60 and the second valve 80, and includes the second port 52 that communicates with the second volute 26b. Thus, depending on the position of the first valve 60, the connecting chamber 58 serves to connect the exhaust gas inlet 24 to the second turbine volute 26b. The wastegate chamber 59 is defined between the second valve 80 and the cover 41, and includes the third port 54 that communicates with the bypass passage 56. Thus, depending on the position of the first valve 60 and the second valve 80, the wastegate chamber 59 serves to connect exhaust gas inlet 24 to the exhaust gas outlet 28 via the bypass passage 56 while bypassing the turbine wheel 30.

Figure 11:
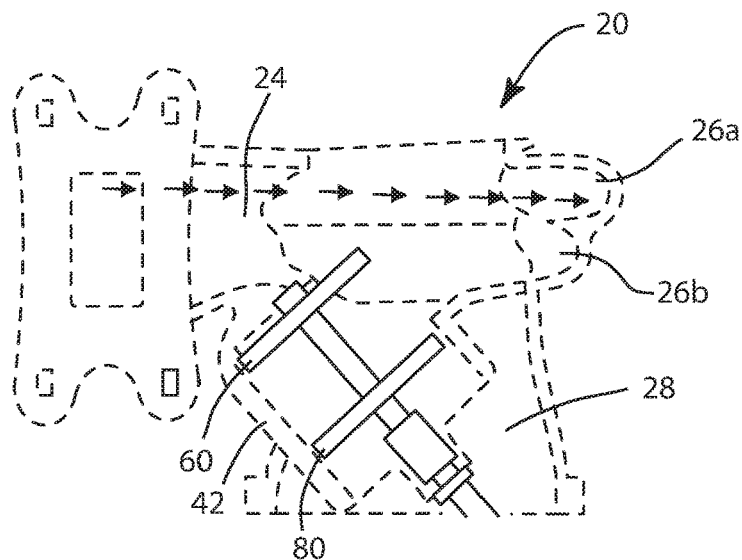
FIG. 11 is an illustration of the exhaust flow path through the turbine section (shown in phantom lines) for a first orientation of the valve assembly of FIG. 1.

Referring to FIGS. 10-13, during operation of the valve assembly 40, the valve shaft 44 is actuated by the actuator to rotate about its longitudinal axis 46. The open and/or closed state of the first and second valves 60, 80 depends on the rotational position of the valve shaft 44. For example, in some embodiments, the valve shaft 44 is rotated between three rotational positions: 0 degrees; 90 degrees; and 270 degrees. When the valve shaft 44 is in an initial rotational position (e.g., at a zero degree rotation), the first valve 60 and the second valve 80 are each oriented such that the valve openings 65, 66 of the first valve body 61 are not aligned with the first valve seat valve opening 75 whereby the first valve 60 is closed, and the second valve body valve opening 85 is not aligned with the second valve seat valve opening 95 whereby the second valve 80 is closed. In this configuration, all exhaust gas flow through the turbine housing 22 is directed through the first secondary passage portion 24b to the first turbine volute 26a (FIG. 11). This valve shaft angular position would be appropriate for use during low exhaust gas flow such as occurs during low engine speed (rpm), low engine load (BMEP) or reduced cylinder displacement for example due to deactivated cylinders.

Figure 12:
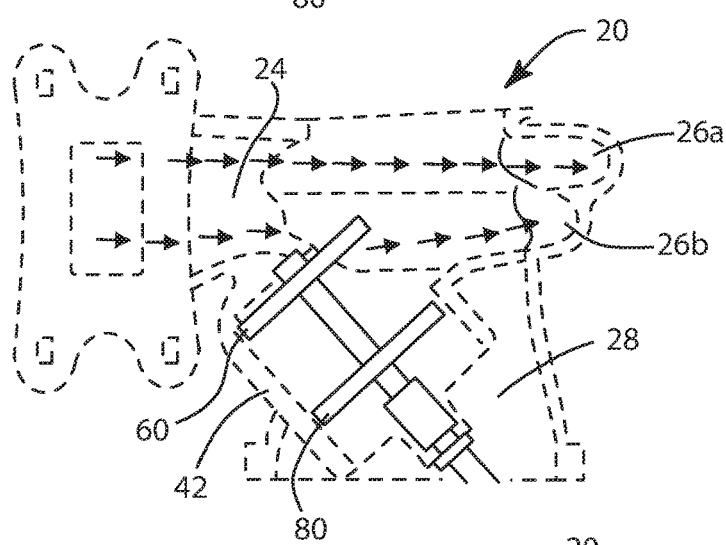
FIG. 12 is an illustration of the exhaust flow path through the turbine section (shown in phantom lines) for a second orientation of the valve assembly of FIG. 1.

When the valve shaft 44 is moved by the actuator to the second rotational position (e.g., corresponding to a 90 degree rotation from the zero degree orientation), the first valve 60 and the second valve 80 are oriented such that the second valve opening 66 of first valve body 61 is aligned with the first valve seat valve opening 75 whereby the first valve 60 is open, and the second valve body valve opening 85 is not aligned with the second valve seat valve opening 95 whereby the second valve 80 is closed. In this configuration, a portion of the exhaust gas flow through the turbine housing 22 is directed is directed through the first secondary passage portion 24b to the first turbine volute 26a, and another portion of the exhaust gas flow through the turbine housing is directed into the second secondary passage portion 24c to the second turbine volute 26b via the connecting chamber 58 (FIG. 12). This valve shaft angular position would be appropriate for use during moderate exhaust gas flow, and the flow to the second turbine volute 26b can be modulated by adjustment of the valve shaft rotational position.

Figure 13:
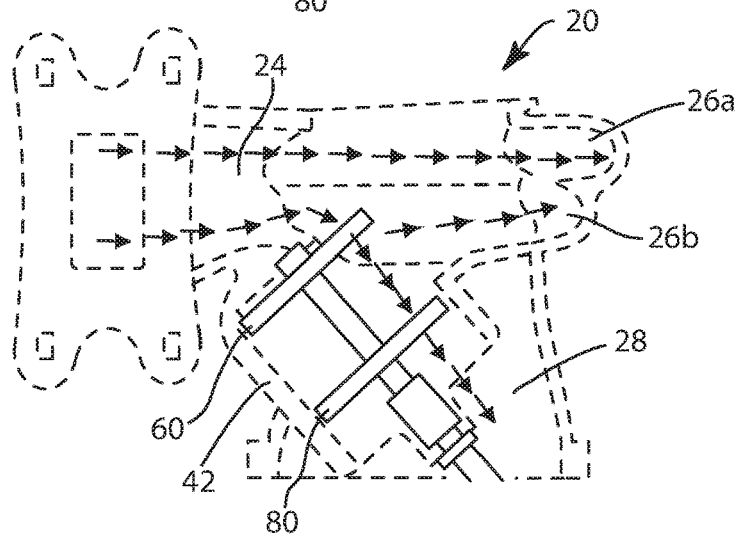
FIG. 13 is an illustration of the exhaust flow path through the turbine section (shown in phantom lines) for a third orientation of the valve assembly of FIG. 1.

When the valve shaft 44 is moved by the actuator to the third rotational position (e.g., corresponding to a 270 degree rotation from the zero degree orientation), the first valve 60 and the second valve 80 are oriented such that the first valve opening 65 of the first valve body 61 is aligned with the first valve seat valve opening 75 whereby the first valve 60 is open, and the second valve body valve opening 85 is aligned with the second valve seat valve opening 95 whereby the second valve 80 is open. In this configuration, a portion of the exhaust gas flow through the turbine housing 22 is directed is directed through the first secondary passage portion 24b to the first turbine volute 26a, another portion of the exhaust gas flow through the turbine housing is directed into the second secondary passage portion 24c to the second turbine volute 26b via the connecting chamber 58, and yet another portion of the exhaust gas flow through the turbine housing 22 is directed into the bypass passage 56 via the wastegate chamber 59 (FIG. 13). This valve shaft angular position would be appropriate for use during high exhaust gas flow, and the flow to the second turbine volute 26b and bypass passage 56 can be modulated by adjustment of the valve shaft rotational position.

For descriptive purposes, three discrete positions of the valve bodies 61, 81 relative to the valve seats 71, 91 are described above in which the respective valves 60, 80 are either fully closed or fully open. However, it is contemplated that a range of intermediate positions can be achieved in which the respective valves 60, 80 are partially open to any desired degree so as to provide a precisely controlled amount of exhaust gas flow through the valves 60, 80.

By using the valve assembly 40 in the turbine section 20, available volute size (measured as A/R) can be optimized for (for example, made proportional to) turbine stage exhaust gas flow. In the configuration described above, high exhaust gas flow is paired with larger volute sizes, and low exhaust gas flow is pair with smaller volute sizes by varying turbine volute size, which is achieved by strategic routing of turbine exhaust gas flow between two adjacent turbine volutes 26a, 26b.

Accordingly, one embodiment of the invention comprises a turbocharger (1) configured to be connected to an engine, the turbocharger (1) comprising
   a turbine section (20) including
     a turbine wheel (30);
     a turbine housing (22) that encloses the turbine wheel (30) and defines
       an exhaust gas inlet (24),
       an exhaust gas outlet (28),
       a first turbine volute (26a) disposed between the exhaust gas inlet (24) and the turbine wheel (30),
       a second turbine volute (26b) disposed between the exhaust gas inlet (24) and the turbine wheel (30), the first and second turbine volutes (26a, 26b) separated by a dividing wall (34),
   the exhaust gas inlet (24) including
     an inlet flange (25) including a flange opening (27),
     a first passage (24a, 24b) that extends between the flange opening (27) and the first turbine volute (26a),
     a second passage (24a, 24c) that communicates with the second turbine volute (26b),
     a valve housing (42) disposed in the exhaust gas inlet (24) between the inlet flange (25) and the first and second turbine volutes (26a, 26b), the valve housing (42) including
       a connecting chamber (58) having a first connecting port (50) that communicates with flange opening and a second connecting port (52) that communicates with the second passage (24a, 24c), a wastegate chamber (59) having a first wastegate port (85, 95) that communicates with the connecting chamber (58) and a second wastegate port (54) that that communicates with exhaust gas outlet (28), a first valve (60) configured to control flow through the first connecting port (50);

a second valve (80) configured to control flow through the first wastegate port (85, 95);

a valve shaft (44) including a rotational axis, the valve shaft (44) connected to both the first valve (60) and the second valve (80), wherein the valve shaft (44) is driven by an actuator to rotate about the rotational axis (46) such that the first valve (60) and the second valve (80) can each be selectively moved between a closed position and an open position, and the time sequence order of opening of the first valve (60) and the second valve (80) is selectable.

Since the valve assembly controls three flow conditions (first secondary passage open, first and second secondary passages open, first and second secondary passages and wastegate open), it is of course possible to design the valve as a three position valve. For example, the arc of the valve openings in either the first valve seat or first valve body is extended to maintain a continuous opening when switching between the second and third positions. When the valve is in the 0° position, both valve openings are closed and all exhaust gas flows through the first secondary passage 24b. When the valve is rotated 90° the first valve 60 is open and exhaust flows through the first and second secondary passages 24b, 24c. When the valve is in the 180° position, the first valve 60 remains open, but now the second valve 80 opens, so that exhaust flows through first and second secondary passages and also the wastegate.

Figure 14:
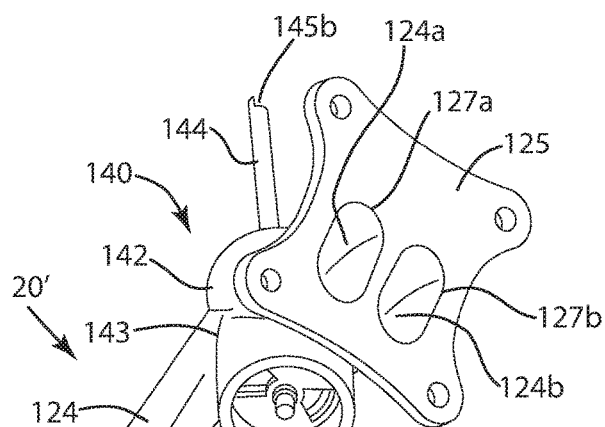
FIG. 14 is a side perspective view of the turbine section including an alternative embodiment valve assembly and omitting a valve housing end cover for clarity.
Figure 15:
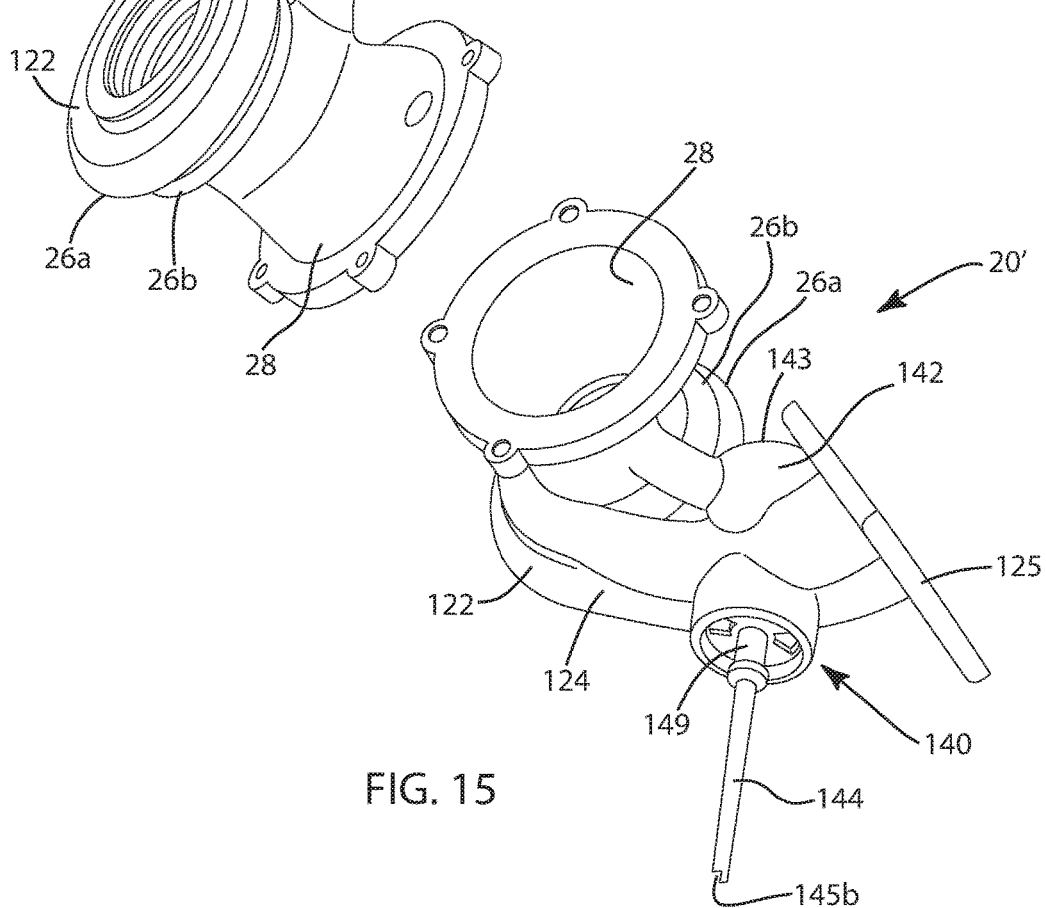
FIG. 15 is an end perspective view of the turbine section including the valve assembly of FIG. 14 omitting a valve housing end cover for clarity.
Figure 16:
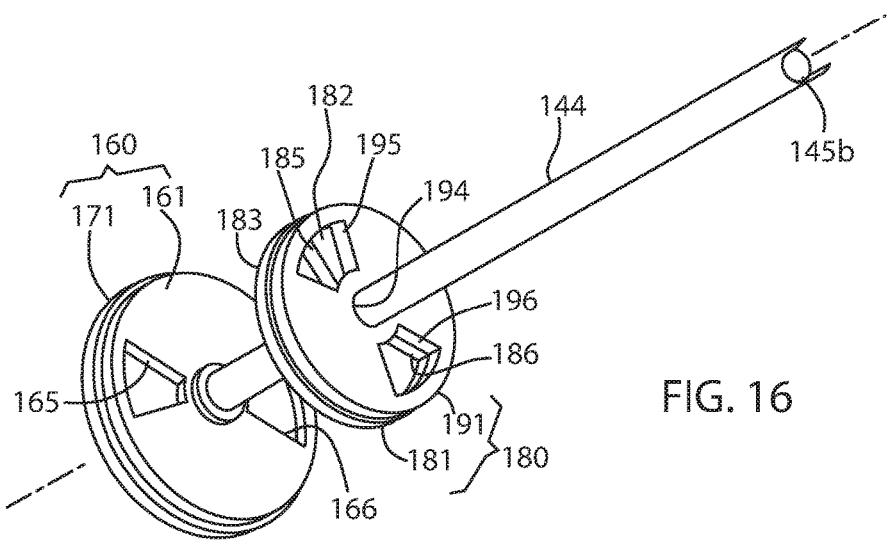
FIG. 16 is a rear perspective view of the valve assembly of FIG. 14 isolated from the turbine section.
Figure 17:
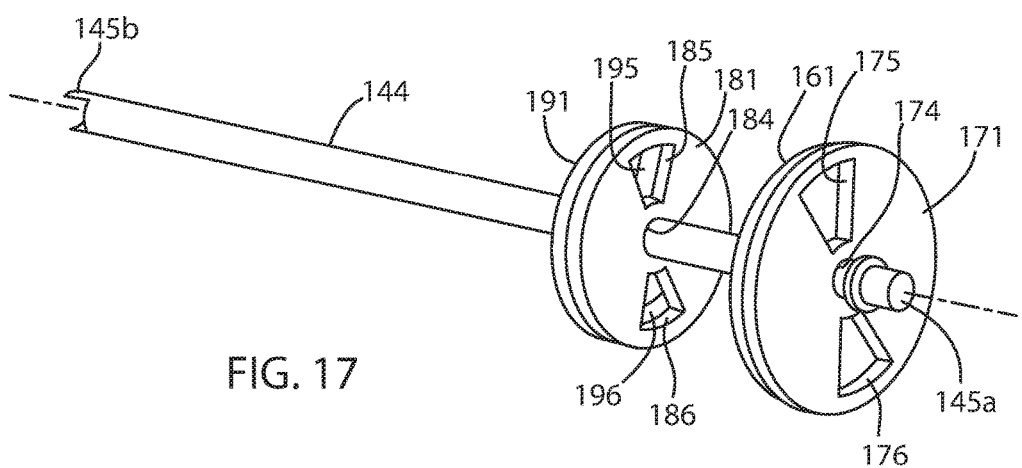
FIG. 17 is a front perspective view of the valve assembly of FIG. 14 isolated from the turbine section.

Referring to FIGS. 14-15, another embodiment valve assembly 140 is used to control the amount of exhaust gas delivered to the turbine section 20' of the turbocharger 1 to assure that the compressor section 10 produces the proper boost over the full range of engine operating speeds, and permit switching of the turbine volute 26 between a mono-scroll design and a twin-scroll design, as discussed further below. The valve assembly 140 is disposed in a valve housing 142 disposed in the exhaust gas inlet 24 between the inlet flange 25 and the first and second turbine volutes 26a, 26b.

Referring to FIGS. 16-19, the valve assembly 140 includes a valve shaft 144, a first valve 160 disposed adjacent to, and slightly spaced apart from, an end 145a of the valve shaft 144, and a second valve 180 disposed on the shaft 144 at a location spaced apart relative to the first valve 160. Each of the first and second valves 160, 180 includes a valve body 161, 181 that moves relative to a valve seat 171, 191 to open and close the valve 160, 180. The first and second valves 160, 180 are rotary valves, and the first valve 160 is slightly larger in diameter than the second valve 180.

Figure 18:
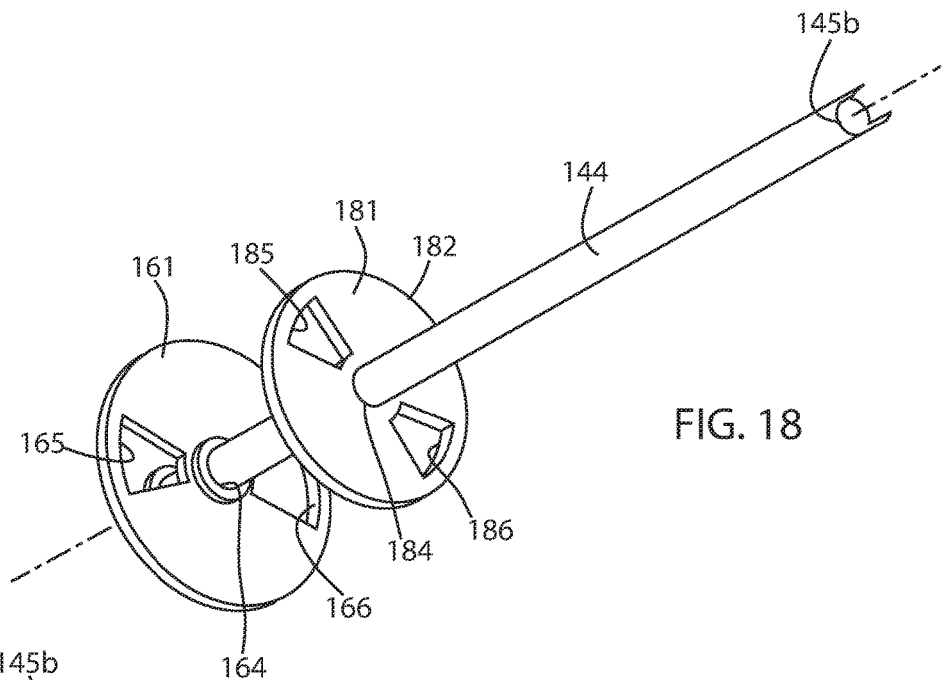
FIG. 18 is a rear perspective view of the valve assembly of FIG. 14 isolated from the turbine section and omitting the valve seats for clarity.
Figure 19:
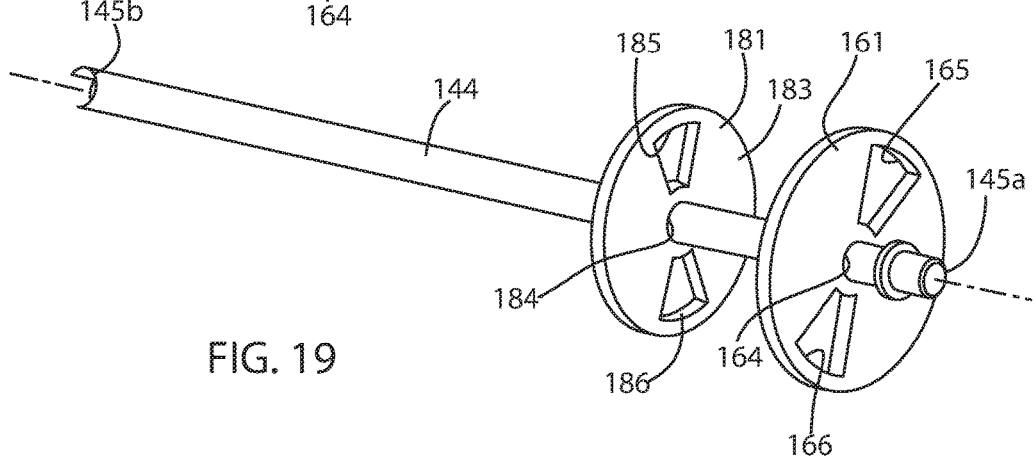
FIG. 19 is a front perspective view of the valve assembly of FIG. 14 isolated from the turbine section and omitting the valve seats for clarity.

The first valve body 161 and the second valve body 181 are similar in that each is a rigid, thin, disc-shaped member having a circular profile (FIGS. 18 and 19). Each of the first and second valve bodies 161, 181 include a central opening 164, 184 which receives the valve shaft 144 and is fixed thereto. In particular, the first and second valve bodies 161, 181 are connected to the valve shaft 144 via the respective central opening 164, 184, for example via a press fit, spline fit, or other conventional connection method. The first valve body 161 includes two valve openings 165, 166. The valve openings 165, 166 of the first valve body 161 are disposed on opposed sides of the shaft 144 and have a fan shape. The second valve body 181 includes two valve openings 185, 186. The valve openings 185, 186 of the second valve body 181 are disposed on opposed sides of the shaft 144 and have a fan shape. When the first valve body 161 and the second valve body 181 are assembled with the shaft 144, the valve openings 185, 186 of the second valve body 181 are not longitudinally aligned with the valve openings 165, 166 of the first valve body 161, and instead are offset by 45 degrees.

The first valve seat 171 and the second valve seat 191 are similar in that each is a rigid, thin disc-shaped member having a circular profile (FIGS. 16 and 17) that is of slightly larger diameter than its respective valve body 161, 181. Each of the first and second valve seats 171, 191 includes a central opening 174, 194 which receives the valve shaft 144 therethrough and permits relative rotation between the shaft 144 and the respective valve seat 171, 191. In some embodiments, a bushing or bearing (not shown) may be disposed in the central opening 174, 194 to enhance support of the valve shaft 144. The first valve seat 171 includes two valve openings 175, 176. The valve openings 175, 176 of the first valve seat 171 are disposed on opposed sides of the shaft 144 and have a fan shape. The second valve seat 191 includes two valve openings 195, 196. The valve openings 195, 196 of the second valve body 191 are disposed on opposed sides of the shaft 144 and have a fan shape. The valve openings 195, 196 of the second valve body 191 are slightly larger (e.g., have a circumferential dimension that is larger) than that of the valve openings 175, 176 of the first valve seat 171. When the first valve seat 171 and the second valve seat 191 are assembled with the shaft 144, the first valve opening 175 of the first valve seat 171 and the first valve opening 195 of the second valve seat 191 are longitudinally aligned, and the second valve opening 176 of the first valve seat 171 and the second valve opening 195 of the second valve seat 191 are also longitudinally aligned.

The first valve body 161 is connected to the valve shaft 44 such that the first valve seat 171 is disposed between the valve body 161 and the shaft terminal end 145a. Likewise, the second valve body 181 is connected to the valve shaft 144 such that an outward-facing surface 183 faces, and is spaced apart from, the first valve body 161, and an inward-facing surface 182 adjoins a facing surface 192 of the second valve seat 191. Thus, the second valve body 181 is disposed between the second valve seat 191 and the first valve 160.

Figure 20:
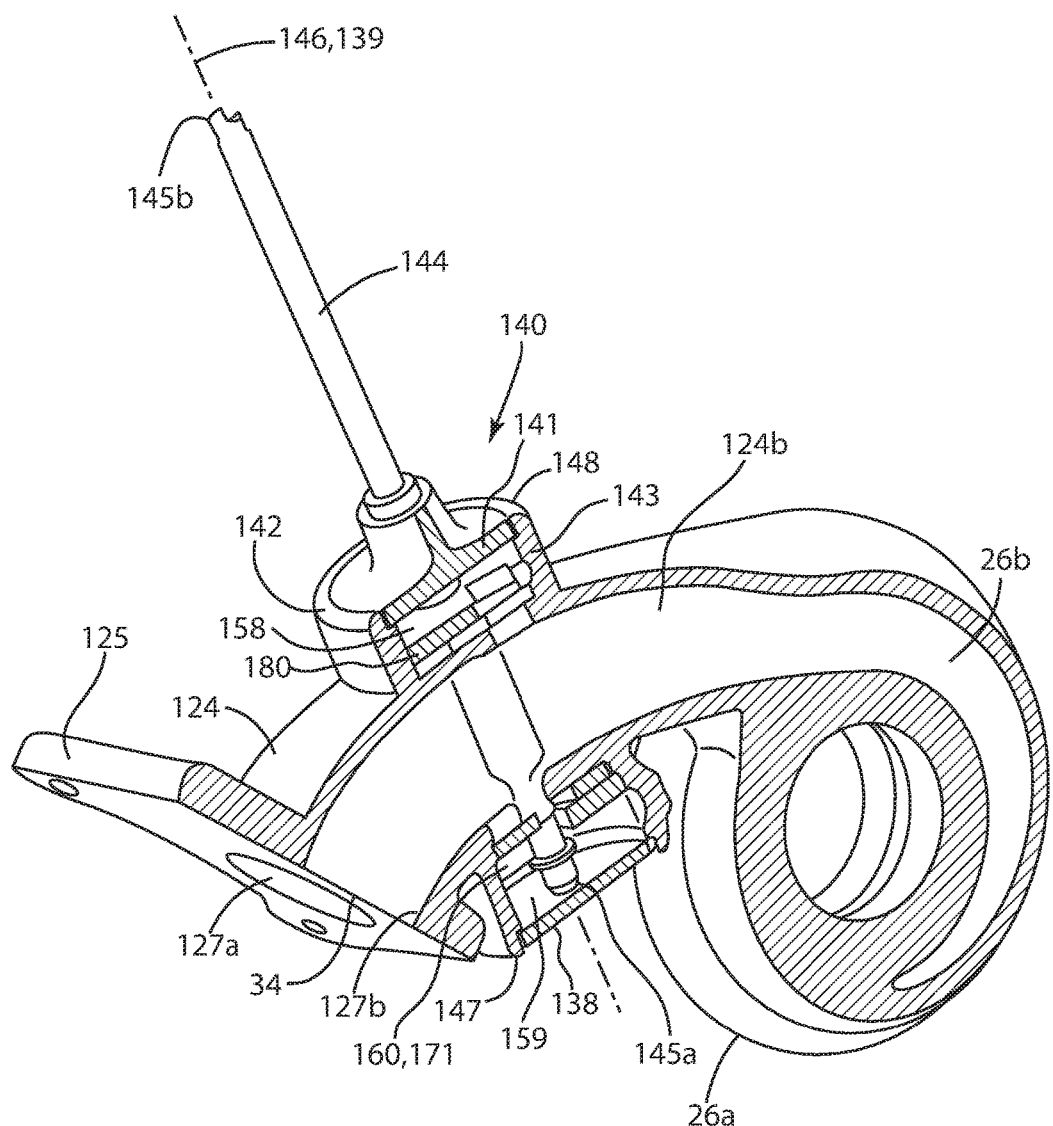
FIG. 20 is a cross-sectional view of the exhaust gas inlet and valve housing of the valve assembly of FIG. 14.

Referring also to FIGS. 14 and 20, in the illustrated embodiment, the exhaust gas inlet 124 includes the inlet flange 125 having two inlet openings 127a, 127b (FIG. 14). The exhaust gas inlet 124 is separated into two inlet passageways 124a, 124b by an extension of the wall 34 that divides the two turbine volutes 26a, 26b. The first inlet passage 124a provides communication between the first inlet opening 127a and the first turbine volute 26a, and the second inlet passage 124b provides communication between the second inlet opening 127b and the second turbine volute 26b (FIG. 20). In some embodiments, the first turbine volute 26a is connected to a first set of cylinders of the engine (not shown) via the first inlet passageway 124a, and the second turbine volute 26b is connected to a second set of cylinders of the engine via the second inlet passageway 124b, where the second set of cylinders has no common cylinders with the first set of cylinders.

The valve assembly 140 is supported relative to the exhaust gas inlet 24 via the valve housing 142. The valve housing 142 has a generally cylindrical sidewall 143 that extends between an open valve housing first end 147, and an open valve housing second end 148 that is opposed to the valve housing first end 147. The valve housing 142 is disposed on the exhaust gas inlet 124 such that a longitudinal centerline 139 of the valve housing 142 is generally transverse an axis defined by a direction of gas flow through the two inlet passageways 124a, 124b. In addition, the longitudinal centerline 139 passes through the divider wall 34 between, and without intersecting, the first and second inlet passages 124a, 124b. In addition, the valve housing first end 147 is disposed on one side of the exhaust gas inlet 124, and the valve housing second end 148 is disposed on an opposed side of the exhaust gas inlet 124.

In order to permit connection to the externally-located actuator, the valve shaft 144 extends out of the valve housing 142 through the open valve housing second end 148. A cover 141 is welded into the open second end 148 so as to form a seal therewith, and the valve shaft 144 is rotatably supported within the cover 141 via an elongated bushing 149. The cover 141 is supported on the valve shaft 144 at a location that is spaced apart from the second valve 180, whereby a connecting chamber 158 is formed between the second valve 180 and the cover 141. In addition, the cover 141 is located between the second valve 180 and an end 145b of the valve shaft 144 that is configured to be connected to the actuator. The cover 141 and the bushing 149 permit the valve shaft 144 to rotate in a sealed manner relative to the valve housing 142.

A second cover 138 is welded into the open valve housing first end 147 so to close the valve housing first end 147 and form a seal therewith. The terminal end 145a of the valve shaft 144 is rotatably supported within a central depression (not shown) formed on an inner surface of the second cover 138. The second cover 138 is spaced apart from the valve seat 171 of the first valve 160, whereby a wastegate chamber 159 is formed in the valve housing 142 between the first valve 160 and the second cover 138. The wastegate chamber 159 is disposed on a side of the exhaust gas inlet 124 opposed to the connecting chamber 158.

Figures 21, 22:
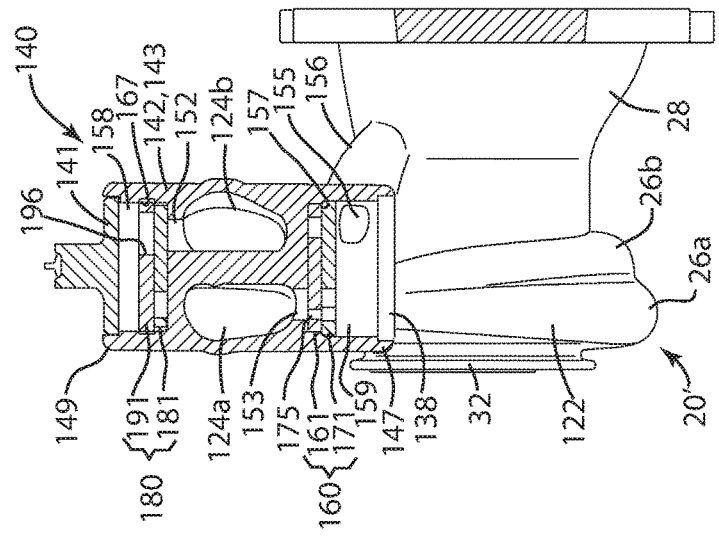
FIG. 21 is another cross-sectional view of the exhaust gas inlet and valve housing of the valve assembly of FIG. 14 illustrating a certain valve ports formed in the valve housing.
FIG. 22 is yet another cross-sectional view of the exhaust gas inlet and valve housing of the valve assembly of FIG. 14 illustrating other valve ports formed in the valve housing.
Figure 23:
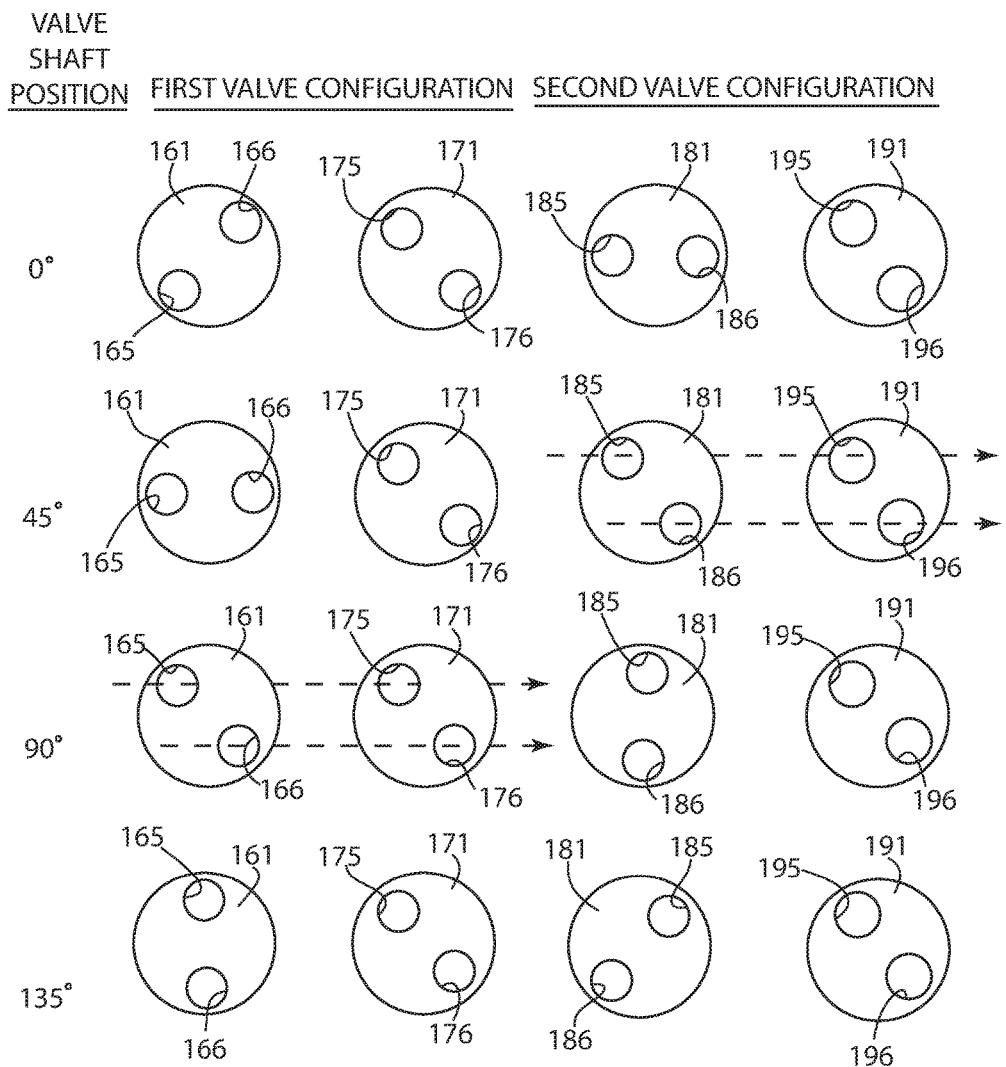
FIG. 23 is a schematic illustration of the relative orientations of the valve body and the valve seat for both the first and second valves of the valve assembly of FIG. 14 for various valve shaft rotational orientations.

Referring to FIGS. 21 and 22, the valve housing 142 includes five ports 151, 152, 153, 154 and 155. The first port 151 is disposed in the exhaust gas inlet 124 and permits communication between the connecting chamber 158 of the valve housing 142 and the first inlet passage 124a (FIG. 21). The second port 152 is disposed in the exhaust gas inlet 124 and permits communication between the connecting chamber 158 and the second inlet passage 124b (FIG. 22). The third port 153 is disposed in the exhaust gas inlet 124 and permits communication between the wastegate chamber 159 of the valve housing 142 and the first inlet passage 124a (FIG. 22). The fourth port 154 is disposed in the exhaust gas inlet 124 and permits communication between the wastegate chamber 159 and the second inlet passage 124b (FIG. 21). The fifth port 155 is disposed in the valve housing sidewall 143 between the second cover 138 and the first valve 160, and permits communication between the wastegate chamber 159 and the exhaust gas outlet 28 via a bypass passage 156 that bypasses the turbine wheel 30.

The valve assembly 140 is disposed with the valve housing 142 such that the valve shaft longitudinal axis 146 and the centerline 139 of the cylindrical valve housing 142 are generally co-axial. In addition, the first valve 160 is disposed in the wastegate chamber 159 so as to control fluid flow through the third and fourth ports 153, 154. To this end, the first valve seat 171 is secured to a first circumferentially-extending valve housing shoulder 157 for example via welding so as to form a seal with the valve housing 142. The first valve seat 171 is oriented relative to the shoulder 157 so that the first valve opening 175 of the first valve seat 171 is longitudinally aligned with the third port 153, and the second valve opening 176 of the first valve seat 171 is longitudinally aligned with the fourth port 154.

In addition, the valve assembly 140 is disposed with the valve housing 142 such that the second valve 180 is disposed in the connecting chamber 158 so as to control fluid flow through the first and second ports 151, 152. To this end, the second valve seat 191 is secured to a second circumferentially-extending valve housing shoulder 167 for example via welding so as to form a seal with the valve housing 142. The second valve seat 191 is oriented relative to the second shoulder 167 so that the first valve opening 195 of the second valve seat 191 is longitudinally aligned with the first port 151, and the second valve opening 196 of the second valve seat 191 is longitudinally aligned with the second port 152.

The connecting chamber 158 is defined between the second valve 180, the sidewall 143 and the first cover 141. Although the connecting chamber 158 is connected to the inlet passageways 124a, 124b via the first and second ports 151, 152, the connecting chamber 158 is otherwise free of ports. Thus, depending on the position of the second valve 180, the connecting chamber 158 serves to connect the first inlet passageway 124a to the second inlet passageway 124b.

The wastegate chamber 159 is defined between the first valve 160, the sidewall 143 and the second cover 138, and is connected to the inlet passageways 124a, 124b via the third and fourth ports 153, 154. In addition, the wastegate chamber 159 includes the fifth port 155 that communicates with the bypass passage 56. Thus, depending on the position of the first valve 160, the wastegate chamber 159 serves to connect exhaust gas inlet 24 to the exhaust gas outlet 28 via the bypass passage 56 while bypassing the turbine wheel 30.

Figure 24:
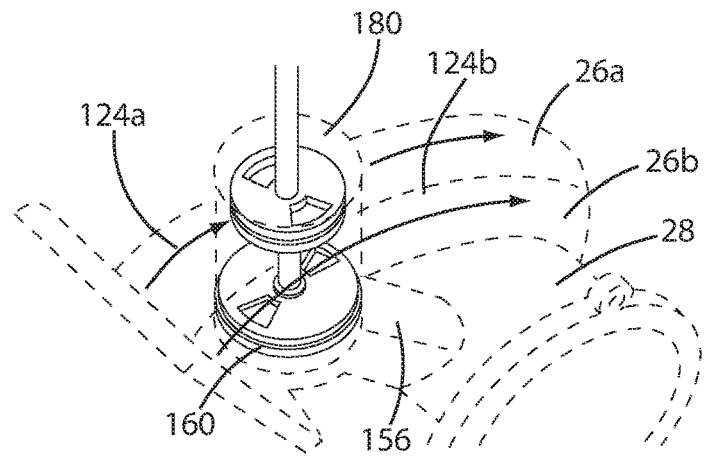
FIG. 24 is an illustration of the exhaust flow path through the turbine section (shown in phantom lines) for a first orientation of the valve assembly of FIG. 14.

Referring to FIGS. 23-26, during operation of the valve assembly 140, the valve shaft 144 is actuated by the actuator to rotate about its longitudinal axis 146. The open and/or closed state of the first and second valves 160, 180 depends on the rotational position of the valve shaft 144. For example, in some embodiments, the valve shaft 144 is rotated between three rotational positions: 0 degrees; 45 degrees; and 90 degrees. When the valve shaft 44 is in an initial rotational position (e.g., at a zero degree rotation), the first valve 160 and the second valve 180 are each oriented such that the valve openings 165, 166 of the first valve body 161 are not aligned with the first valve seat valve openings 175, 176 whereby the first valve 160 is closed, and the second valve body valve openings 185, 186 are not aligned with the second valve seat valve openings 195, 196 whereby the second valve 180 is closed. In this configuration, the turbocharger turbine section 20 operates in a dual scroll mode in which all exhaust gas flow through the turbine housing 22 is directed through the two inlet openings 127a, 127b to the two turbine volutes 26a, 26b via the respective inlet passageways 124a, 124b (FIG. 24). This valve shaft angular position would be appropriate for use during low exhaust gas flow such as occurs during low engine speed (rpm), low engine load (BMEP) or reduced cylinder displacement for example due to deactivated cylinders. Operation as a twin scroll turbine is advantageous since twin scroll designs can separate the exhaust pulses of the engine cylinders, providing high turbine efficiencies at low engine speeds, and providing higher low-end engine torque.

Figure 25:
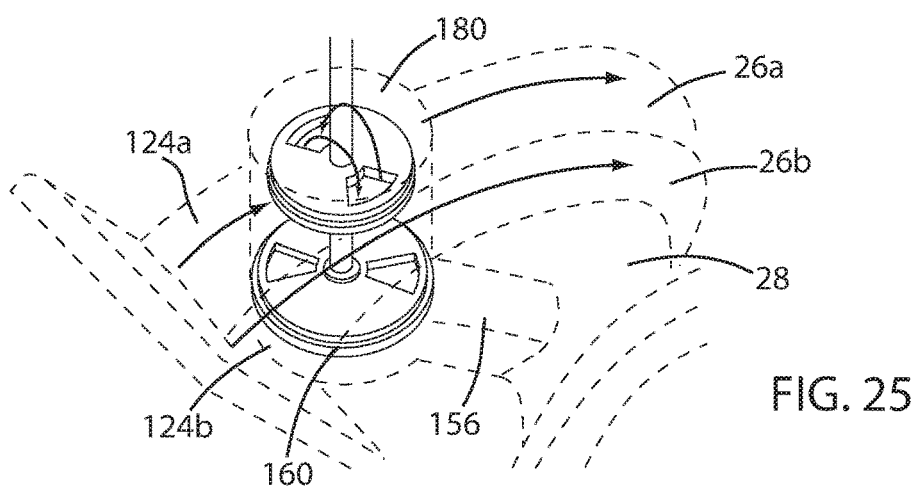
FIG. 25 is an illustration of the exhaust flow path through the turbine section (shown in phantom lines) for a second orientation of the valve assembly of FIG. 14.

When the valve shaft 144 is moved by the actuator to the second rotational position (e.g., corresponding to a relative 45 degree rotation from the zero degree orientation), the first valve 160 and the second valve 180 are oriented such that the valve openings 165, 166 of the first valve body 161 are not aligned with the first valve seat valve openings 175, 176 whereby the first valve 160 is closed, and the second valve body valve openings 185, 186 are aligned with the second valve seat valve openings 195, 196 whereby the second valve 180 is open. In this configuration, all exhaust gas flow through the turbine housing 22 is directed through the two inlet openings 127a, 127b to the two turbine volutes 26a, 26b via the respective inlet passageways 124a, 124b. In addition, the first inlet passageway 124a communicates with the second inlet passageway 124b via the connecting chamber 158, whereby the turbocharger turbine section 20 operates in a mono scroll mode (FIG. 25). This valve shaft angular position would be appropriate for use during moderately high exhaust gas flow. Although mono scroll turbines do not separate engine exhaust pulses at low engine speeds, mono scroll turbines advantageously provide lower exhaust back pressure at high engine speeds, and provide higher peak engine horsepower.

Figure 26:
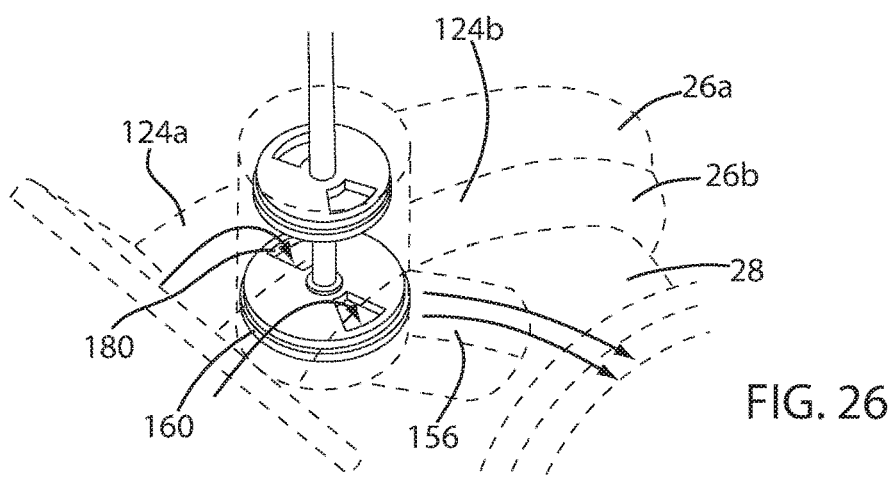
FIG. 26 is an illustration of the exhaust flow path through the turbine section (shown in phantom lines) for a third orientation of the valve assembly of FIG. 14.

When the valve shaft 144 is moved by the actuator to the third rotational position (e.g., corresponding to a 90 degree rotation from the zero orientation), the first valve 160 and the second valve 180 are oriented such that the valve openings 165, 166 of the first valve body 161 are aligned with the first valve seat valve openings 175, 176 whereby the first valve 160 is open, and the second valve body valve openings 185, 186 are not aligned with the second valve seat valve openings 195, 196 whereby the second valve 180 is closed. In this configuration, all exhaust gas flow through the turbine housing 22 is directed through the two inlet openings 127a, 127b to the two turbine volutes 26a, 26b via the respective inlet passageways 124a, 124b. In addition, the first inlet passageway 124a and the second inlet passageway 124b communicate with the wastegate chamber 159, whereby the turbocharger turbine section 20 operates in a wastegated mode (FIG. 26). This valve shaft angular position would be appropriate for use during very high exhaust gas flow in order to prevent over speed of the rotor group (e.g., the turbine wheel 30, the compressor wheel 14 and the connecting shaft 2). The flow to the bypass passage 156 can be modulated by adjustment of the valve shaft rotational position.

For descriptive purposes, three discrete positions of the valve bodies 161, 181 relative to the valve seats 171, 191 are described above in which the respective valves 160, 180 are either fully closed or fully open. However, it is contemplated that a range of intermediate positions can be achieved in which the respective valves 160, 180 are partially open to any desired degree so as to provide a precisely controlled amount of exhaust gas flow through the valves 160, 180.

The valve assemblies 40,140 allow a single turbocharger turbine 20, 20' to function both as a mono-scroll turbine and as a single-scroll turbine, whereby the turbocharger can operate efficiently at all engine speeds. Moreover, the valve assemblies 40, 140 include two rotary valves that can be rotationally oriented to independently control the valve sequence. For example, depending on the configuration of the valve openings in the respective valve seats and valve bodies, the first valve (i.e., the wastegate valve 160) can open either before or after the second valve (i.e, the connecting valve 180). In addition, both valves 160, 180 can be operated by a single actuator, and, due to the rotary style, with very little torque.

It is contemplated that by strategic selection of the number, size, shape and distribution of the valve openings 65, 66, 75, 84, 85, 95, 165, 166, 175, 176, 185, 186, 195, 196 of the two valves 60, 160, 80, 180, exhaust gas flow through the turbine housing can be regulated in various combinations of mono, dual and/or wastegated exhaust gas flow modes, where the modes can be made to occur in sequence or in parallel, and in varying amounts depending on the requirements of the specific application.

In the illustrated embodiments, the valve assembly 40, 140 is connected to, and actuated by, a single actuator. The actuator may be controlled by the boost pressure produced by the turbocharger, a turbocharger controller, or an engine computer which uses the actuator to move the shaft. The turbocharger controller or the engine computer can measure numerous engine operating parameters and calculate the boost required for engine conditions, and the valve assembly can be controlled to allow the turbocharger to provide the required boost. Control of the actuator by the boost pressure is less satisfactory because it does not allow several factors to be taken into consideration in controlling the valve assembly.

In the illustrated embodiments, the actuator is non reversible, and the valves 60, 80, 160, 180 can be opened and then closed (or closed and then opened) through actuation in a single direction of rotation of the actuator shaft 44, 144. In addition, the actuator is not limited to being non-reversible. For example, in some embodiments, the actuator is capable of reversing rotational directions, whereby the time sequence order of opening the valves can be reversed.

In the illustrated embodiments, the valve assembly 40, 140 includes two valves 160, 180 actuated by a common actuation rod (e.g., the valve shaft) 44, 144. Both valves 160, 180 are rotary valves. However, the valve assembly 40, 140 is not limited to employing rotary valves. For example, in some embodiments, one of the valves may be a rotary valve, and the other valve may be a flap valve in which the valve shaft extends in a direction parallel to the flap valve body and is rigidly connected to the flap valve body by an arm that extends perpendicular to the valve shaft. When the valve shaft 44, 144 is rotated, the flap valve body rotates about the shaft axis such that the flap valve body is lifted off the flap valve seat and is angled relative thereto.

The size and scroll proportions of the twin scroll volute 26 of the turbine section are determined based on the requirements of a specific application. In some embodiments, the first turbine volute 26a and the second turbine volute 26 have a substantially similar A/R ratio. In other embodiments, the first turbine volute 26a has a greater A/R ratio than the second turbine volute 26b.

Although the valve body 61, 81, 161, 181 and the valve seat 71, 91, 171, 191 are described herein as having a circular peripheral shape, the valve body 61, 81, 161, 181 and the valve seat 71, 91, 171, 191 are not limited to this peripheral shape. The shape of valve seat 71, 91, 171, 191 will likely correspond to the shape of the valve housing 42, 142 and the shape of the valve body 61, 81, 161, 181 can be made to match, or alternatively can have a polygonal shape or irregularly curved shape.

Although the valve body openings 65, 66, 85 and valve seat openings 75, 95 are described herein as having a fan shape (e.g., a truncated sector shape), they are not limited to this shape. In some embodiments, the openings are shaped to maximize control of fluid flow therethrough. In some embodiments, the openings have other regular curved shapes such as circular or triangular. In some embodiments, the openings have irregular curved shapes (e.g., bean shaped, truncated fan shaped, crescent shaped, etc. In some embodiments, the shape and/or size of the valve body openings is different than the shape and/or size of the valve seat openings.

Selected illustrative embodiments are described above in some detail. It should be understood that only structures considered necessary for clarifying the inventive concepts have been described herein. Other conventional structures, and those of ancillary and auxiliary components of the system, are assumed to be known and understood by those skilled in the art. Moreover, while a working example has been described above, the inventive concepts are not limited to the working examples described above, but various design alterations may be carried out without departing from the present invention as set forth in the claims.

What is claimed is:

1. A turbocharger (1) configured to be connected to an engine, the turbocharger (1) comprising a turbine section (20, 20') including
 a turbine wheel (30);
 a turbine housing (22) that encloses the turbine wheel (30) and defines
  an exhaust gas inlet (24, 124),
  an exhaust gas outlet (28),
  a first turbine volute (26a) extending between the exhaust gas inlet (24, 124) and the turbine wheel (30),
  a second turbine volute (26b) extending between the exhaust gas inlet (24, 124) and the turbine wheel (30), the first and second turbine volutes (26a, 26b) separated by a dividing wall (34),
  a bypass passage (56, 156) that permits communication between the exhaust gas inlet (124) and the exhaust gas outlet (28) and bypasses the turbine wheel (30),
  a first valve (60, 180) configured to control flow through a first port (50, 152) that permits communication between the exhaust gas inlet (124) and the second turbine volute (26b);
  a second valve (80, 160) configured to control flow through a second port (54, 153) that that permits communication between the exhaust gas inlet (124) and the bypass passage (156);
  a valve shaft (44, 144) including a rotational axis (46, 146), the valve shaft (44, 144) connected to both the first valve (60, 180) and the second valve (80, 160),
 wherein the valve shaft (44, 144) is driven by an actuator to rotate about the rotational axis (46, 146), such that
 when the first valve (60) and the second valve (80) are in a closed position, all gas flowing through the exhaust gas inlet (24, 124) is directed to the first turbine volute (26a);
 when the first valve (60) is in an open position and the second valve (80) is in closed position, gas flowing through the exhaust gas inlet (24, 124) is directed to the first turbine volute (26a) and the second turbine volute (26b); and
 when the first valve (60) is in an open position and the second valve (80) is in an open position, gas flowing through the exhaust gas inlet (24, 124) is directed to the first turbine volute (26a), and the second turbine volute (26b), and the bypass passage (56, 156).

2. The turbocharger (1) of claim 1, wherein the first valve (60, 180), the second valve (80, 160) and the valve shaft (44, 144) form a three-position valve.

3. The turbocharger (1) of claim 1, wherein the first valve (60, 180) and the second valve (80, 160) are rotary valves.

4. The turbocharger (1) of claim 1, wherein the exhaust gas inlet (124) includes
 an inlet flange (125) including a first flange opening (127a) and a second flange opening (127b),
 a first passage (124a) that extends between the first flange opening (127a) and the first turbine volute (26a),
 a second passage (124b) that extends between the second flange opening (127b) and the second turbine volute (26),
 a valve housing (142) disposed in the exhaust gas inlet (124) between the inlet flange (125) and the first and second turbine volutes (26a, 26b), the valve housing (142) including
  a connecting chamber (158) including the first port (152) and a third port (151), the first port (152) connecting the connecting chamber (158) and the second passageway (124b), and the third port (151) connecting the connecting chamber (158) and the first passageway (124a), and
  a wastegate chamber (159) that communicates with the bypass passage (156), the wastegate chamber (159) including the second port (153) and a fourth port (154), the second port (153) connecting the wastegate chamber (159) and the first passage (124a), and the fourth port (154) connecting the wastegate chamber (159) and the second passage (124b), wherein
 the first valve (180) is configured to control flow through the first port (152) and the third port (151), and
 the second valve (160) is configured to control flow through the second port (153) and the fourth port (154).

5. The turbocharger (1) of claim 4, wherein the connecting chamber (158) and the wastegate chamber (159) are disposed on opposed sides of the exhaust gas inlet (124).

6. The turbocharger (1) of claim 4, wherein when the first valve (180) is in an open position, the first passage (124a) communicates with the second passage (124b) via the connecting chamber (158).

7. The turbocharger (1) of claim 1, wherein the exhaust gas inlet (24) includes
 an inlet flange (25) including a flange opening (27),
 a first passage (24a, 24b) that extends between the flange opening (27) and the first turbine volute (26a),
 a second passage (24a, 24c) that communicates with the second turbine volute (26b),
 a valve housing (42) disposed in the exhaust gas inlet (24) between the inlet flange (25) and the first and second turbine volutes (26a, 26b), the valve housing (42) including
  a connecting chamber (58) that communicates with the second passage (24a, 24c), the connecting chamber (58) including the first port (50) that connects the connecting chamber (58) and the flange opening (27),
  a wastegate chamber (59) that communicates with the bypass passage (56), the wastegate chamber (59) communicating with the connecting chamber (58) via valve openings (85, 95) of the second valve (80).

8. A turbocharger (1) configured to be connected to an engine, the turbocharger (1) comprising
 a turbine section (20') including
 a turbine wheel (30);
 a turbine housing (122) that encloses the turbine wheel (30) and defines
  an exhaust gas inlet (124),
  an exhaust gas outlet (28),
  a first turbine volute (26a) disposed between the exhaust gas inlet (124) and the turbine wheel (30),
  a second turbine volute (26b) disposed between the exhaust gas inlet (124) and the turbine wheel (30), the first and second turbine volutes (26a, 26b) separated by a dividing wall (34), the exhaust gas inlet (124) including
- an inlet flange (125) including a first flange opening (127a) and a second flange opening (127b),
- a first passage (124a) that extends between the first flange opening (127a) and the first turbine volute (26a),
- a second passage (124b) that extends between the second flange opening (127b) and the second turbine volute (26b),
- a valve housing (142) disposed in the exhaust gas inlet (124) between the inlet flange (125) and the first and second turbine volutes (26a, 26b), the valve housing (142) including
  - a connecting chamber (158) having a first connecting port (151) that communicates with the first passage (124a) and a second connecting port (152) that communicates with the second passage (124b),
  - a wastegate chamber (159) having a first wastegate port (153) that communicates with the first passage (124a) and a second wastegate port (154) that communicates with the second passage (124b),
  - a first valve (180) configured to control flow through the first connecting port (151) and the second connecting port (152),
  - a second valve (160) configured to control flow through the first wastegate port (153) and the second wastegate port (154), and
  - a valve shaft (144) including a rotational axis (146), the valve shaft (144) connected to both the first valve (180) and the second valve (160),
- wherein the valve shaft (144) is driven by an actuator to rotate about the rotational axis (146) such that
  - the first valve (180) and the second valve (160) can each be selectively moved between a closed position and an open position, and
  - the time sequence order of opening of the first valve (180) and the second valve (160) is selectable.

9. The turbocharger (1) of claim 8, wherein the wastegate chamber (159) includes a third wastegate port (155) that communicates with the exhaust gas outlet (28).

10. The turbocharger (1) of claim 8, wherein the connecting chamber (158) and the wastegate chamber (159) are disposed on opposed sides of the exhaust gas inlet (124).

11. The turbocharger (1) of claim 8, wherein when the first valve (180) is in an open position, the first passage (124a) communicates with the second passage (124b) via the connecting chamber (158).

* * * * *